US010104047B2

(12) United States Patent
Muma et al.

(10) Patent No.: US 10,104,047 B2
(45) Date of Patent: Oct. 16, 2018

(54) METHOD AND SYSTEM FOR ENCRYPTING/DECRYPTING PAYLOAD CONTENT OF AN OTN FRAME

(71) Applicant: Microsemi Storage Solutions (U.S.), Inc., Aliso Viejo, CA (US)

(72) Inventors: Scott Arthur Muma, Coquitlam (CA); Victor Gusev Lesau, Vancouver (CA); Winston Ki-Cheong Mok, Vancouver (CA); Somu Karuppan Chetty, Vancouver (CA)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 186 days.

(21) Appl. No.: 15/093,949

(22) Filed: Apr. 8, 2016

(65) Prior Publication Data
US 2016/0301669 A1  Oct. 13, 2016

Related U.S. Application Data

(60) Provisional application No. 62/144,645, filed on Apr. 8, 2015.

(51) Int. Cl.
*H04L 29/06* (2006.01)
*H04L 9/08* (2006.01)

(52) U.S. Cl.
CPC ........ *H04L 63/0428* (2013.01); *H04L 9/0822* (2013.01); *H04L 63/06* (2013.01); *H04L 2209/60* (2013.01)

(58) Field of Classification Search
CPC ....... H04L 63/06; H04L 63/0428; H04L 9/12; H04L 9/0822; H04L 2209/60
See application file for complete search history.

(56) References Cited

U.S. PATENT DOCUMENTS 7,043,019 B2 * 5/2006 Tehranchi ............... G06T 1/005
  348/E9.027
7,242,772 B1 * 7/2007 Tehranchi ............ H04N 7/1675
  348/E7.056

(Continued)

FOREIGN PATENT DOCUMENTS

WO  2015014597 A1  2/2015

OTHER PUBLICATIONS

Koopman et al., "Cyclic Redundancy Code (CRC) Polynomial Selection for Embedded Networks", The International Conference on Dependable Systems and Networks: 145-154. doi:10.1109/DSN.2004.1311885. ISBN 0-7695-2052-9, Jun. 2004, 11 pages.

(Continued)

*Primary Examiner* — Don G Zhao
(74) *Attorney, Agent, or Firm* — Leber IP Law; Dennis R. Haszko

(57) ABSTRACT

The present disclosure relates to a system and method of encrypting and decrypting Optical Transport Network (OTN) payload content. A transmitter of the system includes a series of ordered encryption keys and a counter for generating an initialization vector to be combined with one of the encryption keys for encrypting the OTN payload content. A receiver of the system includes a series of ordered decryption keys and a counter for generating an initialization vector to be combined with one of the decryption keys for decrypting the encrypted OTN payload content. The system synchronizes switching, at the transmitter and the receiver, the encryption and decryption keys to the next keys in each series. The system also synchronizes the counters for generating the same initialization vector at the transmitter and the receiver.

15 Claims, 14 Drawing Sheets

(56) References Cited

U.S. PATENT DOCUMENTS

| | | | |
|---|---|---|---|
| 8,401,188 B1* | 3/2013 | Swaminathan | G06F 21/10 380/200 |
| 2004/0165722 A1* | 8/2004 | Van Rijnsoever | H04L 9/12 380/43 |
| 2005/0186933 A1* | 8/2005 | Trans | H04B 1/00 455/296 |
| 2006/0050869 A1* | 3/2006 | Tuvell | G06F 21/6218 380/28 |
| 2011/0296534 A1* | 12/2011 | Risan | G06F 21/10 726/30 |
| 2012/0008778 A1* | 1/2012 | Mayer | H04L 9/12 380/255 |

OTHER PUBLICATIONS

Williams, "A Painless Guide to CRC Error Detection Algorithms", http://www.ross.net/crc/download/crc_v3.txt, Aug. 19, 1993, pp. 1-35.
International Telecommunications Union, "Interfaces for the Optical Transport Network (OTN)," ITU-T Recommendation G.709/Y. 1331, Telecommunication Standardization Sector of ITU, 238 pages, Feb. 2012.
International Telecommunication Union (ITU), "Characteristics of optical transport network hierarchy equipment functional blocks", ITU-T G.798 (Dec. 2012) Pre-published version, 397 pages.

* cited by examiner

METHOD AND SYSTEM FOR ENCRYPTING/DECRYPTING PAYLOAD CONTENT OF AN OTN FRAME

FIELD

The present disclosure relates generally to encryption and authentication in Optical Transport Network (OTN) devices. More particularly, the present disclosure relates to encryption and authentication for payload carried in OTN frames.

BACKGROUND

The International Telecommunication Union Standardization Sector (ITU-T) defines an Optical Transport Network (OTN) as a set of Optical Network Elements (ONE) connected by fiber optic links, able to provide functionality of transport, multiplexing, routing, management, supervision and survivability of optical channels carrying client signals. The OTN was designed to provide support for optical networking using wavelength division multiplexing (WDM) unlike its predecessor SONET/SDH.

Typical signals that OTN equipment processes at the Optical Channel layer may include: OTN, SONET/SDH, Ethernet/Fiber Channel, Packets. These signals may undergo the following transformations: Protocol processing of all the signals (such as Forward Error Correction on OTN signals; Multiplexing and de-multiplexing OTN signals; Mapping and de-mapping of non-OTN signals into and out of OTN signals) and Packet processing in conjunction with mapping/de-mapping of packet into and out of OTN signals.

ITU-T G.709 (G.709) provides network interface definitions for the OTN. It defines standard interfaces and rates, improves transport network performance and facilitates the evolution to higher backbone bandwidths. The three parts of the G.709 frame are the overhead, the payload, and the forward error correction (FEC). The overhead provides operation, administration, and maintenance (OAM) capabilities. The FEC helps reduce the number of transmission errors on noisy links, which enables the deployment of longer optical spans.

The current OTN standard does not provide encryption to the payload carried in OTN frames. Thus the end user must rely on high-layer solutions to provide end-to-end encryption.

Therefore, improvements in OTN-related encryption are desirable.

SUMMARY OF INVENTION

In a first aspect, the present disclosure provides a method for encrypting and decrypting Optical Transport Network (OTN) payload content. The method comprises obtaining, at an OTN transmitter, a series of ordered encryption keys to be used one at a time and in sequential order for encrypting the OTN payload content to obtain OTN encrypted payload content. Obtaining the series of ordered encryption keys at the OTN transmitter can be exclusive of any encryption key of the series of ordered encryption keys being received at the OTN transmitter in any OTN frame. The method further comprises, at an OTN receiver, a series of ordered decryption keys to be used one at a time and in sequential order for decrypting the encrypted OTN payload content. Obtaining the series of ordered decryption keys at the OTN receiver can be exclusive of any decryption key of the series of ordered decryption keys being received at the OTN transmitter in any OTN frame. The method also comprises, synchronizing a decryption key of the series of ordered decryption keys with an encryption key of the series of ordered encryption keys by providing, in an OTN frame transmitted from the OTN transmitter to the OTN receiver, key synchronization data, the key synchronization data to indicate to the OTN receiver that the next key in the series of ordered decryption keys is to be used to decrypt forthcoming additional OTN encrypted payload content transmitted from the OTN transmitter, the forthcoming additional OTN encrypted payload content being the result of an encryption of additional OTN payload content with the next key in the series of ordered decryption keys.

The synchronization data can comprise a Key Table Index (KTI) that identifies the next key in the series of ordered decryption keys to be used to decrypt the forthcoming additional OTN encrypted payload content. The forthcoming additional OTN encrypted payload content can have associated thereto a Multi-Frame Indicator (MFI) value and the synchronization data can further comprises the MFI value. The method can further comprise, at the OTN receiver and subsequent having been provided the synchronization data: in accordance with the KTI, selecting the next key in the series of ordered decryption keys to obtain a selected decryption key; receiving further OTN encrypted payload content; determining a MFI value associated to the further OTN encrypted payload content; and when the MFI value of the further OTN encrypted payload content matches the MFI value comprised in the synchronization data, decrypting the further OTN encrypted payload content by using the selected decryption key.

Each OTN frame transmitted from the OTN transmitter to the OTN receiver can include a counter field having associated thereto a counter value, the counter field being a concatenation of an MFI field, which includes a respective MFI value, and a Multi Frame Alignment Signal (MFAS) field, which includes a MFAS value associated with a number of MFAS transmitted by the OTN transmitter. The method can further comprise, at the OTN transmitter, determining the counter value; and, when the KTI meets a pre-determined criterion, changing the KTI. The pre-determined criteria can one of: the counter value being equal to a target counter value and the counter value being larger than the target counter value.

Synchronizing the decryption key of the series of ordered decryption keys with the encryption key of the series of ordered encryption keys can include placing the key synchronization data into a reserved overhead field of the OTN frame transmitted from the OTN transmitter to the OTN receiver.

Synchronizing the decryption key of the series of ordered decryption keys with the encryption key of the series of ordered encryption keys can include placing the key synchronization data into the Payload Structure Identifier (PSI) field of the OTN frame transmitted from the OTN transmitter to the OTN receiver.

In some embodiments, an OTN frame can have a BIP-8 value stored therein and the method can further comprise, at the OTN transmitter, compensating the stored BIP-8 value by: calculating a BIP-8 value of the OTN payload content; calculating a BIP-8 value of the encrypted OTN payload content; and calculating a compensated BIP-8 value as function of: the BIP-8 value of the OTN payload content, the BIP-8 value of the encrypted OTN payload content, and the stored BIP-8 value; and, when the compensated BIP-8 value is different from the stored BIP-8 value, setting the stored BIP-8 value to the compensated BIP-8 value. Calculating the compensated BIP-8 value can include performing an exclusive 'or' operation between the BIP-8 value of the OTN payload content, the BIP-8 value of the encrypted OTN payload content, and the stored BIP-8 value.

The method can further comprise, at the OTN receiver: calculating a BIP-8 value of the received encrypted OTN payload content; decrypting the received encrypted OTN payload content to obtain received decrypted OTN payload content; calculating a BIP-8 value of the received decrypted OTN payload content; calculating a further BIP-8 value as a function of: the BIP-8 value of the received encrypted OTN payload content, the BIP-8 value of the received decrypted OTN payload content, and the stored BIP-8 value; and when the further BIP-8 value is different from the stored BIP-8 value, setting the stored BIP-8 value to the further BIP-8 value. Calculating the further BIP-8 value can include performing an exclusive 'or' operation between the BIP-8 value of the received encrypted OTN payload content, the BIP-8 value of the received decrypted OTN payload content, and the stored BIP-8 value.

In some embodiments, the method can further comprise placing a counter value in the OTN frame associated with the OTN payload content, the counter value being a function of a multiframe indicator value and of a multiframe alignment signal value. Additionally, the method can comprise, at the OTN receiver: monitoring the counter value; comparing the counter value with an immediately prior counter value; and determining an occurrence of a replay attack when the counter value is less that the immediately prior counter value. When a replay attach is determined to have occurred, the method can include automatically overwriting the payload content of the OTN frame The method can further comprise, at the OTN transmitter, placing an authentication tag in a reserved field of and OTN frame associated with the OTN payload content, the authentication tag being a function of the OTN payload content. Additionally, the method can comprise, at the OTN receiver, calculating a calculated tag in accordance with the received encrypted OTN payload content; comparing the calculated tag with the authentication tag; and when the calculated tag is different from the authentication tag, automatically overwriting the payload content of the OTN frame.

In some embodiments, the method can comprise, at the transmitter, generating the series of ordered encryption keys; and, at the OTN receiver, generating the series of ordered decryption keys. The method can additionally comprise, at the OTN transmitter: placing a counter value in an OTN frame associated with OTN payload content, the counter value being a function of a multiframe indicator value and of a multiframe alignment signal value; and using the counter value as an initialization vector to generate one of the encryption keys of the series of ordered encryption keys; and, the OTN receiver, receiving the counter value; and using the counter value as the initialization vector to generate one of the decryption keys of the series of ordered decryption keys.

In another aspect, the present disclosure provides a system for encrypting and decrypting Optical Transport Network (OTN) payload content. The system, comprises: an encryption controller to receive OTN payload content, a frame counter value, and a multiframe counter value, the frame counter value and the multiframe counter value being associated to the OTN payload content, the encryption controller to generate an unique initialization vector for at least each frame of a multiframe in accordance with the frame counter value and the multiframe counter value; and an encryption engine operationally connected to the encryption controller, the encryption engine to obtain the initialization vector and the OTN payload content from the encryption controller, the encryption controller to further obtain an encryption key, the encryption engine to generate encrypted OTN payload content as a function of the initialization vector, the encryption key, and the OTN payload content.

The system can further comprise: a decryption controller to receive encrypted OTN payload content and synchronization data for synchronizing the frame counter value and the multiframe counter value, the decryption controller to generate a calculated initialization vector for at least each frame of a multiframe in accordance with the synchronized frame counter value and the synchronized multiframe counter value; and a decryption engine operationally connected to the decryption controller, the decryption engine to obtain the calculated initialization vector and the encrypted OTN payload content from the decryption controller, the encryption controller to further obtain a decryption key, the decryption engine to generate decrypted OTN payload content as a function of the calculated initialization vector, the decryption key, and the encrypted OTN payload content.

The system can further comprise a processor configured to insert the synchronization data into overhead fields of an OTN frame, the OTN frame including the encrypted OTN payload content.

BRIEF DESCRIPTION OF THE DRAWINGS

Embodiments of the present disclosure will now be described, by way of example only, with reference to the attached Figures.

DETAILED DESCRIPTION

Encryption of traffic "in-flight" is defined as encrypting data as it traverses from source to destination in a network. This is not to be confused with encryption of data "at-rest", which refers to protecting access to data stored in hard drives on PCs or large storage arrays in datacenters and central offices.

Conventionally, in-flight encryption is provided by higher-layer solutions. "Higher-layer" refers to the Open System Interconnection (OSI) model of telecommunications, which divides different communication functions into layers 1-7. Higher-layer in-flight encryption solutions, such as IPsec and MACsec, which are respectively layer 3 and layer 2 solutions, suffer from drawbacks including poor network efficiency and latency.

Accordingly, embodiments of the present disclosure provide a layer 1 in-flight encryption solution. In particular, the layer 1 solution provides encryption to an OTN communication system. Layer 1 of the OSI model is colloquially referred to as the physical layer. The physical layer describes the physical hardware specification of telecommunications equipment. Therefore, the layer 1 solution of the present disclosure relates to physical layer OTN communications hardware.

In addition to providing in-flight encryption, the layer 1 solution of the present disclosure may also provide a message authentication code for each block of in-flight encrypted data. A message authentication code is a piece of information used to confirm the source and integrity of a message. In other words, the message authentication code provides confidence to a recipient that the received message did indeed come from the named sender and that the message was not altered in any way. Processes related to the message authentication code may be simply referred to as "authentication" in the present disclosure.

The present disclosure provides a method and system for enabling OTN encryption and authentication of OPUk payloads and selected OPUk overhead columns. The system comprises an OTN transmitter device and an OTN receiver device, wherein each OTN device (transmitter and receiver) has a key table for encrypting and decrypting the ODU payload. The OTN transmitter device and the OTN receiver device can be part of a same OTN transceiver. The method comprises configuring and synchronizing the transmitter and receiver to use the same key when encrypting and decrypting the ODU payload. Synchronization is provided by in-band messaging.

Figure 1:
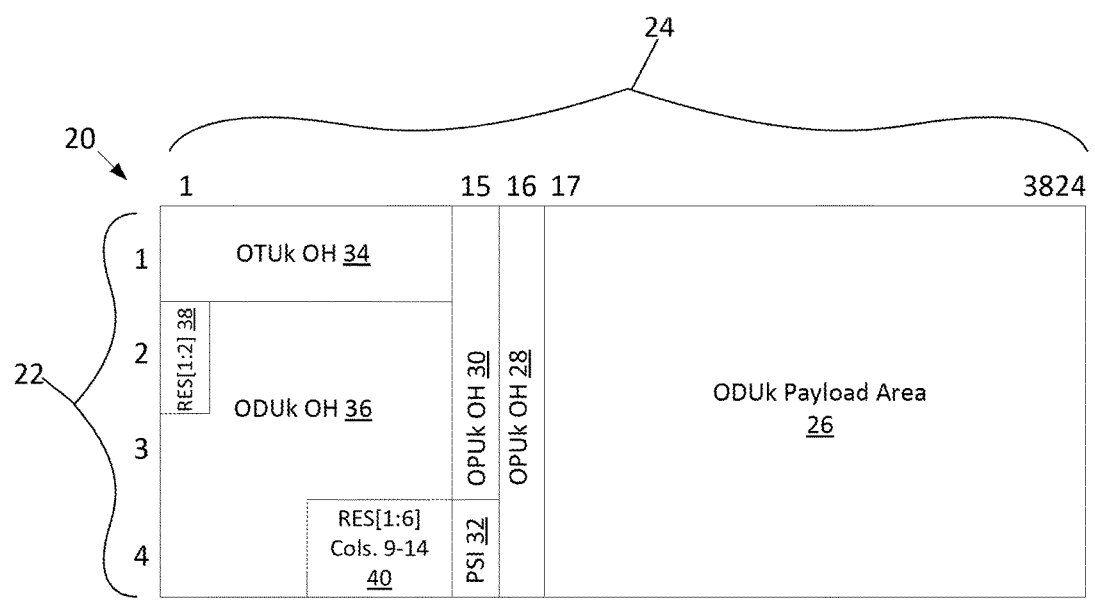
FIG. 1 is a representation of an exemplary OTN frame including an encrypted payload.

FIG. 1 shows an OTN frame 20 that comprises a set 22 of 4 rows and a set 24 of 3824 columns. While an OTN frame 20 also includes forward error correction data (FEC), the FEC bits are not shown in FIG. 1 for simplicity. The OTN frame includes an ODUk payload area 26, an OPUk overhead area 28 at column 16, and another OPUk overhead area 30 at column 15. Column 15 also includes a one-byte Payload Structure Identifier (PSI) field 32. The OTN frame further comprises an OTUk overhead area 34, an ODUk overhead area 36, a reserved byte area 38, and a reserved byte area 40. Column 15, rows 1-3, and column 16 of the OTN frame 20 can be used for payload in accordance with ITU-T G.709.

As will be described below, in some embodiments of the present disclosure, only the ODUk Payload Area 26 is encrypted/decrypted; in other embodiments, where the OPUk overhead area 28 is used for payload, only the ODUk Payload Area 26 and the OPUk overhead area 28 are encrypted/decrypted; in yet other embodiments, where the OPUk overhead area 28, and rows 1 through 3 of the OPUk overhead area 30 are used for payload, the ODUk Payload Area 26, the OPUk overhead area 28, and rows 1 through 3 of the OPUk overhead area 30 are encrypted/decrypted.

In addition to basic in-flight encryption of the payload 26, there exists a need to provide more robust in-flight encryption of the payload 26. More robust encryption may include at least two security techniques: periodically switching an encryption key and periodically switching an initialization vector.

First, periodically switching the encryption key may improve security by reducing the scope of compromised data when an encryption key is compromised. Embodiments of present disclosure comprise methods for switching the encryption key and may improve the security of the encrypted messages.

Second, periodically switching the initialization vector may improve security by reducing a risk associated with a cryptographic limitation of block ciphers. In particular, encryption using a symmetric block cipher ideally requires combining a unique block cipher with a unique initialization vector for each encryption operation. In the field of cryptography, it is known that reusing a key with an initialization vector diminishes the security of the message encrypted via the reused key and initialization vector.

Considering the Advanced Encryption Standard (AES) as an example, the block cipher operates on blocks of 128 bits of data at a time. Encrypting an OTN payload using AES would require breaking the payload into many 128 bit pieces. Each 128 bit piece should be encrypted using a unique AES key and initialization vector combination. In practice, the same key is used for many consecutive 128 bit pieces and the initialization vector is changed for each 128 bit piece of payload data. Because the key must be kept secret and the initialization vector can be known (without affecting encryption security), it is easier to change the initialization vector more often than the key.

The present disclosure provides a structured method to change the initialization vector so that a unique key and initialization vector combination is used for each encryption operation. Accordingly, embodiments of the present disclosure may improve the security of the encrypted messages. In an embodiment, the method comprises counting the frame numbers and multiframe numbers at each transmitter and receiver of the OTN encryption system, and using the frame number and multiframe number counts in creating the initialization vector for encrypting and decrypting the OTN payload.

Figure 2:
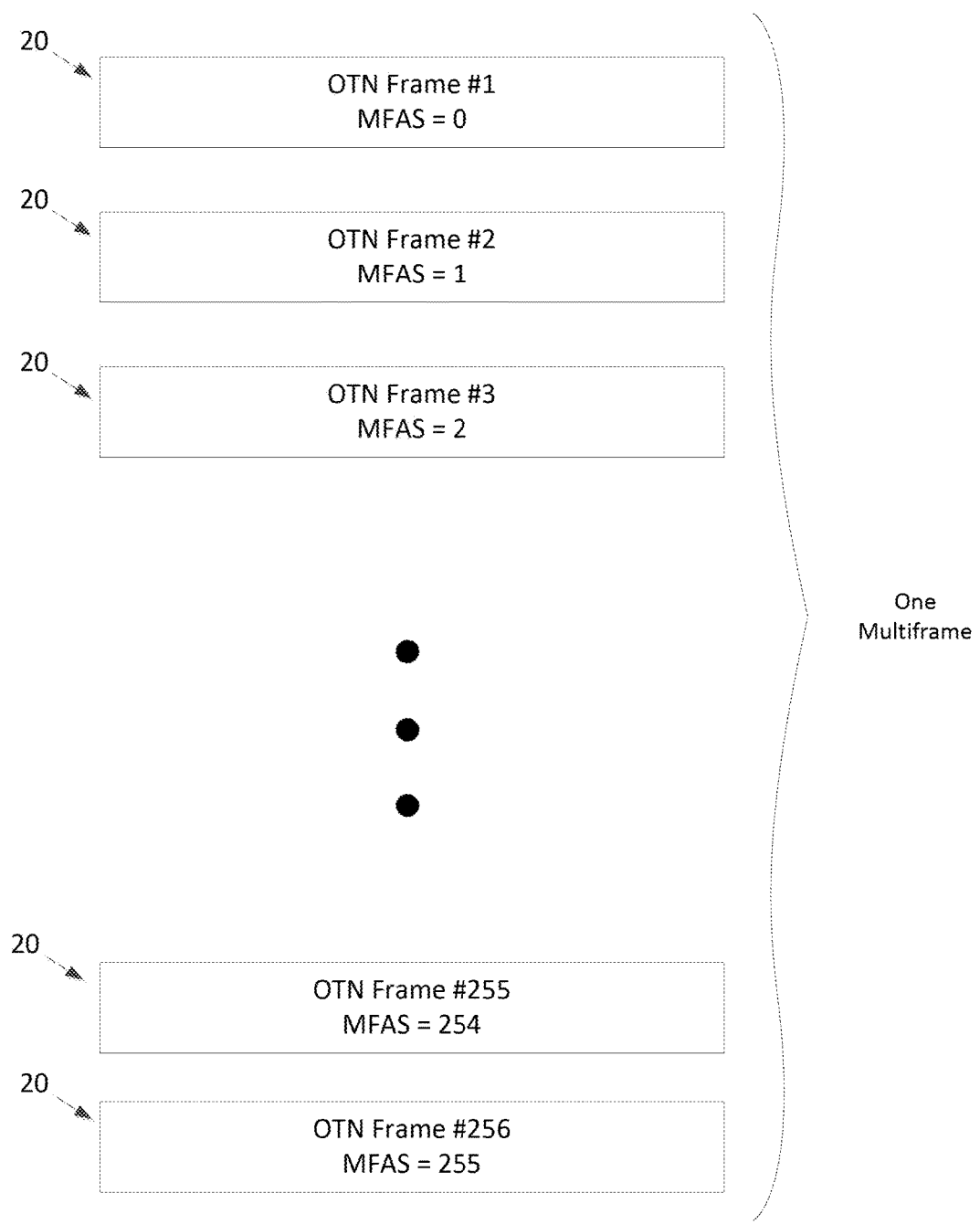
FIG. 2 is a representation of an exemplary multiframe.

FIG. 2 shows an exemplary multiframe. The OTUk overhead area 34 comprises the one-byte Multiframe Alignment Signal (MFAS) field. A multiframe is a sequence of 256 consecutive OTN frames. The MFAS field of each OTN frame is an 8-bit counter that increments by 1, from 0 to 255, for each OTN frame. Therefore, as shown in FIG. 2, the first frame has an MFAS field value of 0; the second frame has an MFAS field value of 1, and so on. The last frame (number 256) of the multiframe has an MFAS field of 255. The next OTN frame in sequence would be the first frame of a second multiframe; therefore, the MFAS field counter rolls over to 0 once again to denote a multiframe boundary. The MFAS number provides a count of the number of frames per multiframe, which, in accordance with the present disclosure, may be used in creating the initialization vector. A count of the number of multiframes may also be used in creating the initialization vector. The multiframe count may be derived from a multiframe indicator (MFI) value stored in the PSI field 32 of a subset of frames in each multiframe.

Figure 3:
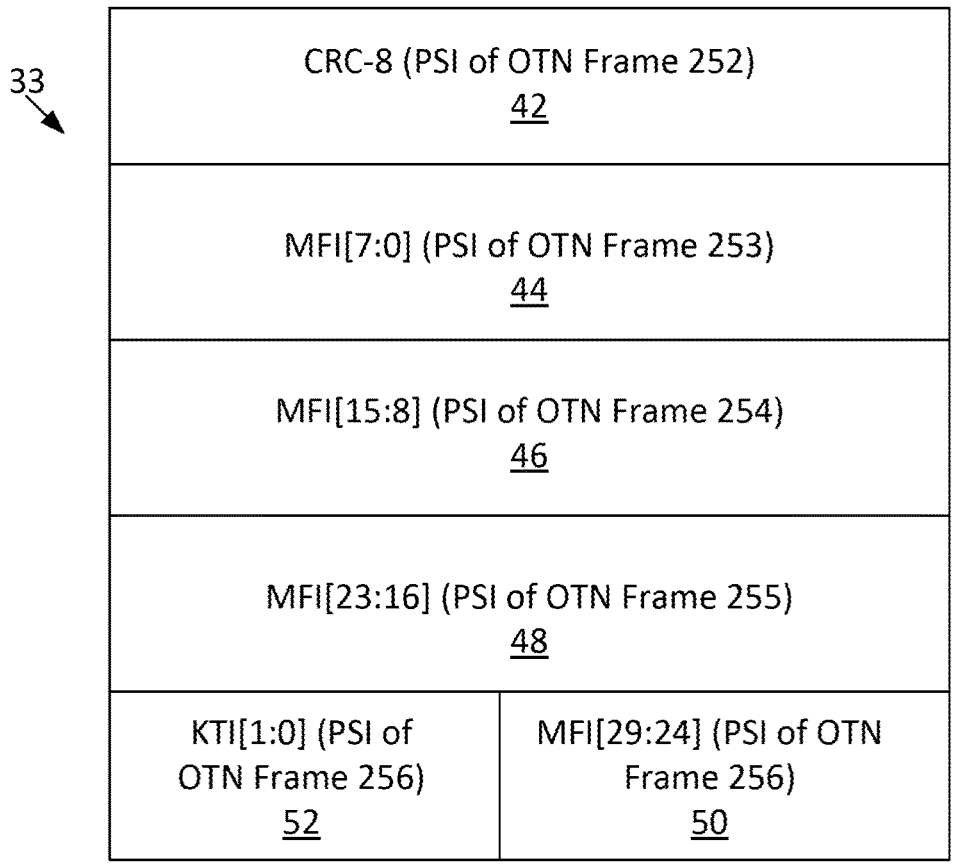
FIG. 3 is a representation of a list of PSI fields for storing in-band synchronization data.

FIG. 3 shows an example of a list 33 of MFI values stored over a number of PSI fields. List 33 shows 5 PSI fields corresponding to the 5 rows of the list 33. Each PSI field is 8 bits in length. The data shown in PSI fields 1 to 5 of list 33 are carried in the PSI fields 32 of OTN frames 252 to 256, respectively, of the multiframe shown in FIG. 2.

The first PSI field (obtained from the PSI of OTN frame 252) in list 33 contains a CRC-8 value 42, which is used for protecting the integrity of other data carried in the PSI fields of subsequent OTN frames; the CRC-8 value 42 will be described in further detail below.

The second PSI field (obtained from the PSI of OTN frame 253) in list 33 contains the first 8 bits 44 (i.e., bits 0 to 7) of the MFI value of the multiframe. Similarly, the third (obtained from the PSI of OTN frame 254) and fourth (obtained from the PSI of OTN frame 255) PSI fields in list 33 respectively contain the second 8 bits 46 (i.e., bits 8 to 15) and third 8 bits 48 (i.e., bits 16 to 23) of the MFI value.

The fifth PSI field (obtained from OTN frame 256) in list 33 contains a two-bit key table index (KTI) value 52, to be discussed in further detail below, and the last 6 bits 50 (i.e. bits 24 to 29) of the MFI value of the multiframe. When all MFI bits 44, 46, 48, and 50 are concatenated, the full MFI value is achieved. Accordingly, in the present embodiment, the MFI value is 30 bits in length and the MFI value can count up to $2^{30}$ multiframes. It would be clear to those skilled in the art, however, that the MFI value may be increased to more than 30 bits in length. For example, in a further embodiment, bits of the MFI value may be carried in the PSI field of OTN frames 252, 251, 250, etc. When all of the bits of the MFI value of all of the relevant PSI fields in a multiframe are concatenated, the MFI value may be larger than 30 bits in length. Using a larger MFI value allows for synchronization (between a transmitter and a receiver) of larger multiframe counters.

Figure 4:
FIG. 4 is a representation of a 38-bit counter including concatenated bits.

Further, the MFI value may be concatenated with the MFAS field value (located at row 1, column 7, of the OTUk OH 34 shown at FIG. 1) to create a 38-bit counter 54 shown at FIG. 4. The counter 54 includes MFI[7:0], 8 bits; MFI [15:8], 8 bits; MFI[23:16], 8 bits; MFI[29:24], 6 bits; and MFAS[7:0], 8 bits. Because 256 frames are accumulated within one multiframe, the 30 MFI bits are the most significant bits in the 38-bit counter and the 8 MFAS bits are the least significant bits in the 38-bit counter. The 38-bit counter can count up to $2^{38}$ OTN frames.

Each OTN frame carries an MFAS value in its MFAS field; however, not every OTN frame carries an MFI value in its PSI field. As explained above, only the $253^{rd}$ to $256^{th}$ frames of each multiframe carry partial MFI values. Therefore, a full MFI value is transmitted once per multiframe, over the course of four frames at the end of the multiframe. The purpose of transmitting the MFAS and MFI values is to synchronize the MFAS and MFI counters at an OTN receiver with the MFAS and MFI counters at an OTN transmitter.

Figure 5:
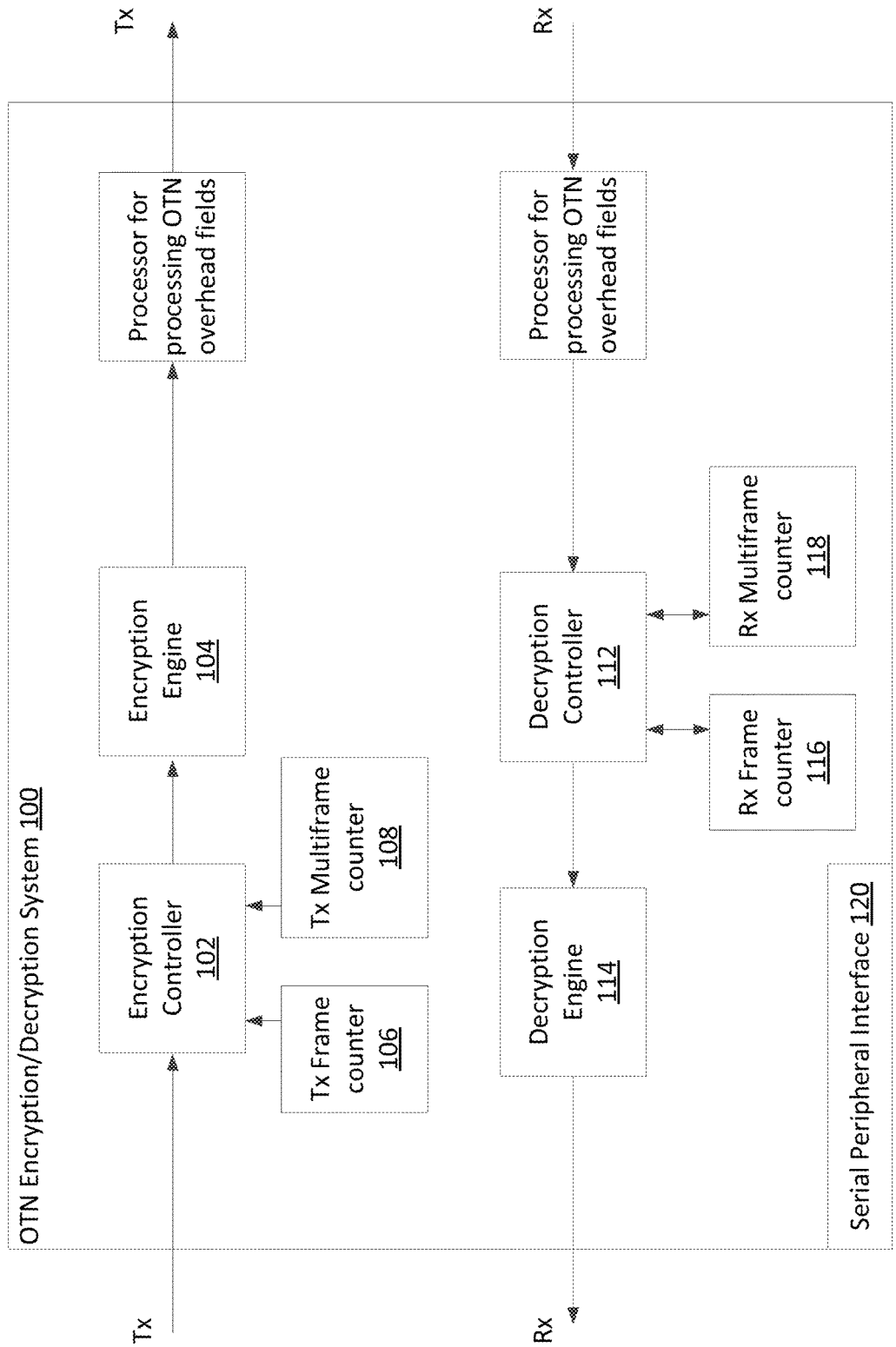
FIG. 5 is a diagram of an OTN encryption and decryption system according to an embodiment of the present disclosure.

FIG. 5 shows an OTN encryption and decryption system 100 according to an embodiment of the present disclosure. The system 100 may be implemented in an OTN transceiver, which is a hardware component having both transmitter and receiver functions. The system 100 provides in-flight OTN encryption and decryption to the OTN transceiver. The system 100 comprises, in a Tx path, an encryption controller 102 and an encryption engine 104. The encryption controller 102 is coupled to: a Tx frame counter 106, a Tx multiframe counter 108, and the encryption engine 104. The encryption controller 102 may include a key table or couple to a separate key table (not shown) for storing encryption keys. The encryption controller 102 may further include a block counter or couple to a separate block counter (not shown) for providing a block value used in block cipher encryption.

The encryption controller 102 generates a unique initialization vector based on values provided by the Tx frame counter 106 and the Tx multiframe counter 108. The unique initialization vector may also be based on the block value. The unique initialization vector generated by the encryption controller is different for at least each frame of a multiframe.

The encryption controller 102 provides the OTN payload data, the unique initialization vector and the encryption key to the encryption engine 104 for generating an encrypted OTN payload. The encrypted OTN payload is the same bit size as the plaintext OTN payload; therefore, the system 100 is 100% throughput efficient because the system 100 does not add additional encryption overhead bits. In contrast, conventional higher-layer encryption solutions may necessitate encryption overhead bits, leading to lower network efficiency.

The system 100 also may comprise, in an Rx path, a decryption controller 112 and a decryption engine 114. The decryption controller 112 is coupled to: an Rx frame counter 116, an Rx multiframe counter 118, and the decryption engine 114. The decryption controller 112 may include a key table or couple to a separate key table (not shown) for storing decryption keys. In an embodiment, the system relies on symmetric encryption keys, which are used for both encryption and decryption; that is, the encryption key and the decryption key are the same. The decryption controller 112 may further include a block counter or couple to a separate block counter (not shown) for providing a block value used in block cipher decryption.

The decryption controller 112 generates a calculated initialization vector based on values provided by the Rx frame counter 116 and the Rx multiframe counter 118. The calculated initialization vector may also be based on the block value. The calculated initialization vector generated by the decryption controller is different for at least each frame of a multiframe. Moreover, the calculated initialization vector will be identical to a unique initialization vector generated by the encryption controller if the decryption controller and the encryption controller are synchronized. Synchronization will be discussed in more detail below.

The decryption controller 112 provides the encrypted OTN payload data, the calculated initialization vector and the encryption key to the decryption engine 114 for recovering a plaintext OTN payload from the encrypted OTN payload.

In an exemplary OTN communication system comprising a pair of OTN transceivers, a first system 100 will be transmitting encrypted OTN data while a second system 100 will be receiving encrypted OTN data. The system 100 acting as a transmitter will be referred to herein as a transmitter for simplicity; similarly, the system 100 acting as a receiver will be referred to herein as a receiver for simplicity. Each OTN transmitter and receiver has a key table and consults the key table for encrypting and decrypting the ODUk payload. The key table in the OTN transmitter is a series of ordered encryption keys; the key table in the OTN receiver is, when the system relies on symmetric keys, the same series of ordered encryption keys, which are used for decryption.

In an embodiment, the key tables of each transmitter and receiver are programmed via a serial peripheral interface (SPI) 120 of the system 100. The SPI 120 may also be used for configuring the system 100 of each transmitter and receiver.

The SPI 120 allows new pairs of keys to be loaded into the transmitter and the receiver when the keys contained in the key tables of the transmitter and the receiver are due to expire. Higher-layer applications and software (not shown) may have responsibility for programming the key tables of the system 100. Further, the software may include separate key tables for storing large lists of ordered keys, and include functions for managing those keys. For example, a key management function may include ensuring that the same key is provided to the SPI 120 of each transmitter and receiver. The key management software may also ensure that keys are not reused or that duplicate keys do not exist in the key table. The software may also include a mechanism, such as public key exchange, for exchanging keys between the transmitter and receiver in a secure manner. Unencrypted keys are never provided to the transmitter or the receiver through OTN frames communicated between the transmitter and receiver.

The SPI 120 serves as a dedicated and secure key passing interface to the system 100. The SPI 120 also enables passing sensitive encryption related configuration information (key, nonce, encryption/authentication boundary, key lifetime, enables) to the configuration space (e.g. a memory) of the system 100. The SPI 120 may interface with higher-layer functions of an OTN device, such as key management software, to allow the software to load keys and configuration information into the system 100. The configuration space of the system 100 is not otherwise accessible by any microprocessor external to the system 100; therefore, the SPI 120 may allow an external entity to write keys to the system 100 but prevent the external entity from reading keys from the system 100, which promotes improved encryption key security.

In embodiments according to the present disclosure, system 100 may further comprise a processor configured to insert/extract encryption related fields to/from the PSI byte field (CRC, KTI and MFI); extract BIP from TCM/PM fields and insert compensated BIP; and insert/extract authentication tag into the reserved bytes.

Embodiments of the present disclosure relate to encrypting and decrypting the ODUk payload using any symmetric block cipher. Examples of symmetric block ciphers are Data Encryption Standard (DES) and Advanced Encryption Standard (AES). Embodiments of the present disclosure describe an implementation using AES encryption; however, it would be known to those skilled in the art that the embodiments of the present disclosure may work with many other symmetric block ciphers, including future symmetric block ciphers yet to be adopted by industry.

While DES was widely used at one time, it has proved inadequate against modern cryptanalysis attacks, which has led to AES largely superseding DES in popularity. Although AES is currently a leading block cipher standard, it too may be superseded due to advances in cryptanalysis and computer processing power. Therefore, it would be clear to those skilled in the art that the present disclosure should not be limited to AES-specific implementations.

As discussed above, a first technique for providing a more robust encryption includes periodically switching the encryption key. In operation of the system 100, the transmitter sends the two-bit KTI value 52 to the receiver once each multiframe. The transmitter uses the KTI value 52 to signal to the receiver that the transmitter will switch its encryption key and that the receiver should also switch its encryption key. If both the transmitter and the receiver synchronize each respective key switch, the receiver will be able to properly decrypt the encrypted OTN payload.

Figure 6:
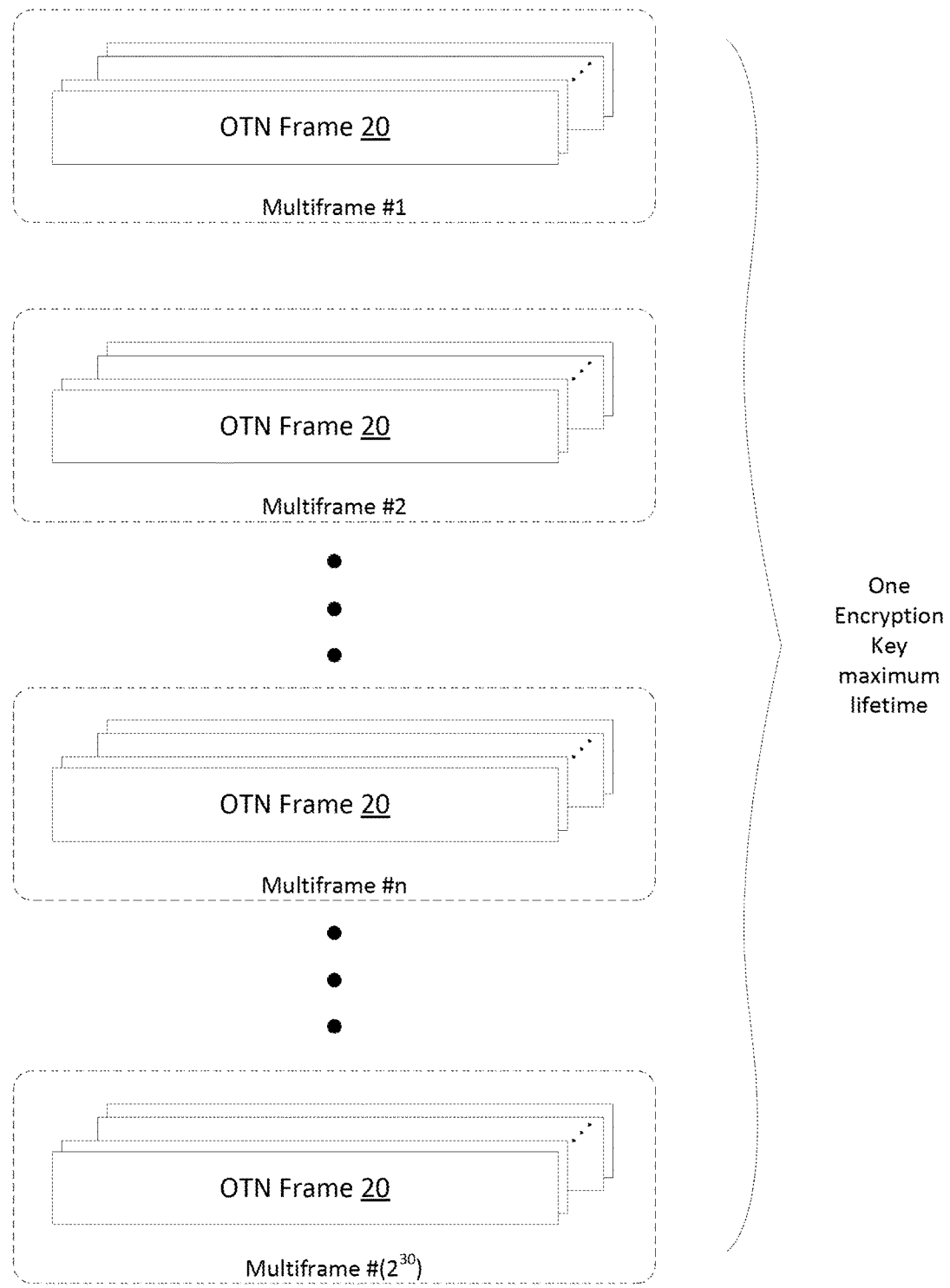
FIG. 6 is a representation of a sequence of multiframes.

As shown in FIGS. 2 and 3, the KTI value 52 is carried in the PSI field 32 of the 256th OTN frame of each multiframe. FIG. 6 shows a sequence of multiframes from 1 to $2^{30}$. Each multiframe includes 256 frames and a KTI value is transmitted in the $256^{th}$ frame of each multiframe. Therefore, each 256th frame (for example, the boundary between Multiframe #1 and Multiframe #2) is an opportunity for the transmitter to signal the receiver to switch encryption keys. In other words, the encryption key may switch between each multiframe. It is not necessary that the encryption key switch at each multiframe boundary.

According to an embodiment, the MFI counter is 30 bits; therefore, the maximum key lifetime is $2^{30}$ multiframes and, in this specific implementation, the encryption key must switch by the $2^{30}$th multiframe. As an example, given an OTU4 period of 1.1 μs, the maximum key life of this implementation is approximately 80 hours.

The present disclosure provides an in-band solution for synchronizing the decryption key with the encryption key. In an embodiment, in-band synchronization data comprises the KTI value 52. Since the KTI value 52 is carried in byte 255 of the PSI field 32 of the OTN frame 20, the synchronization data does not need to be carried in out-of-band implementations separate from the OTN protocol. In-band synchronization via the OTN protocol advantageously allows the in-flight encryption system to operate as a layer 1 solution.

The in-band synchronization data transmitted from the transmitter to the receiver is used to indicate, to the receiver, when to select or switch over to the next key in the series of ordered decryption keys in order to decrypt forthcoming OTN encrypted payload content. The forthcoming OTN encrypted payload content is the result of encrypting the forthcoming OTN payload content with a next key in the series of ordered encryption keys.

In an example operation of the system 100, the transmitter will increment the two-bit KTI value 52 when the transmitter intends to switch to the next encryption key. For example, the current encryption key is associated with a binary KTI value of 0b00 and the next encryption key is associated with a binary KTI value of 0b01. The following encryption key after the next key is associated with a binary KTI value of 0b10 and the yet following key is associated with the binary KTI value of 0b11. Since the KTI value is two bits, the fifth key in sequence will cause a rollover of the KTI value back to 0b00. In the present embodiment, it is the increment from one KTI value to another that signals the key switch. The magnitude of the KTI value itself does not signal a key switch. The magnitude of the KTI value is associated with a particular key in a sequence and helps to ensure that the transmitter and the receiver are using the same keys.

Referring to FIG. 6, an example of how the system 100 handles key switchover will be described. Assume the chosen key lifetime is 5 multiframes. The transmitter will send the KTI value 0b00 in the PSI field 32 of the 256th frame of Multiframe #1; the transmitter will send the same 0b00 value in the PSI field 32 of the 256th frame of Multiframe #2, and so on for Multiframe #3 and #4 (not shown). The lack of increment in the KTI value indicates to the receiver that no key switchover is about to occur. Since the chosen key lifetime is 5 multiframes, the transmitter must signal a key switchover to the receiver before the 6th multiframe. Therefore, the transmitter will increment the KTI value and send a 0b01 value in the PSI field 32 of the 256th frame of Multiframe #5. When the receiver detects the incremented KTI value at the end of the 5th multiframe, the receiver will automatically switch to the next encryption key (associated with the value 0b01) for decrypting the OTN payloads of the frames of the 6th multiframe. Although a five-multiframe key lifetime is shown as an example, according to embodiments of the present disclosure, the key lifetime may be selected to be any number between 1 to $2^{30}$ multiframes.

Figure 7:
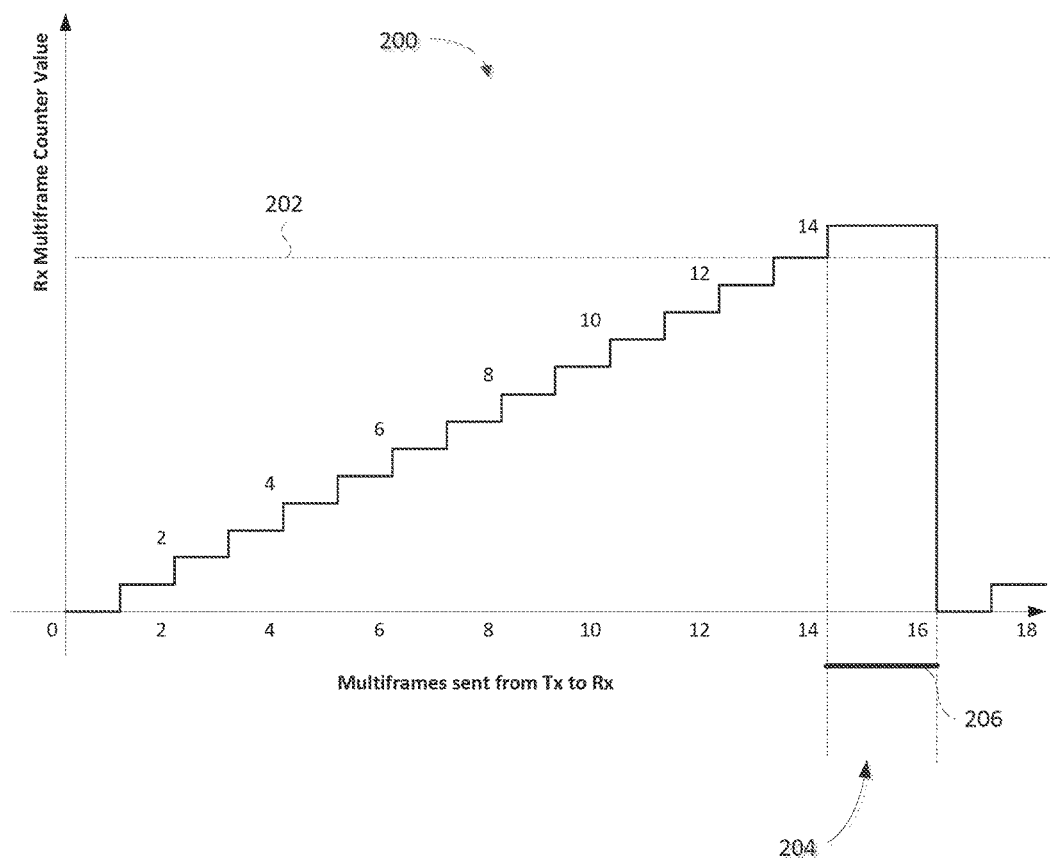
FIG. 7 is a graph showing an example operation of the system of FIG. 5.

FIG. 7 is a graph 200 showing an example operation of the system 100. Graph 200 shows a value of the Rx multiframe counter 118 compared to the number of multiframes sent from the transmitter to the receiver. The Rx decryption controller 112 compares its internal multiframe count (on the y-axis of the graph 200) to the configured maximum key lifetime in order to ensure that the receiver is not using an expired key.

In this example, the system 100 is configured with a maximum key lifetime 202 of 14 multiframes. At period 204, the Rx decryption controller 112 determines that the maximum has been exceeded and that the receiver has not switched to the next key. This condition could be caused, for example, by a lack of the next key in the key table of the receiver. Therefore, at period 204, the Rx decryption controller inputs a failure pattern 206 into the payload of the decrypted OTN frame. The failure pattern will alert higher-layer applications of the key error. Consequently, higher-layer applications may load the appropriate next key into the key table of the receiver via the SPI 120. Once the Rx decryption controller 112 has the next key, it will reset the Rx multiframe counter 118 and decrypt the encrypted OTN payload.

Although the example of FIG. 7 shows an operation of the Rx decryption controller 112, the Tx encryption controller 102 may operate similarly in the key expiry condition.

In a further embodiment, the in-band synchronization data also comprises the MFI bits 44, 46, 48, and 50, which are transmitted in the PSI field 32 of OTN frames 253 to 256 of a multiframe. Using the MFI bits for in-band synchronization data is particularly advantageous where a block cipher such as AES encryption is used.

As discussed above, a second technique for providing a more robust encryption includes periodically switching the initialization vector. Providing the MFI bits as in-band synchronization data helps to synchronize internal counters between the transmitter and the receiver. These internal counters at the transmitter and the receiver are used for generating a unique initialization vector and a calculated initialization vector, respectively.

Referring back to FIG. 5, the encryption controller 102 generates the unique initialization vector based on values provided by the Tx frame counter 106 and the Tx multiframe counter 108. The unique initialization vector is then used in conjunction with the AES key to uniquely encrypt each 128-bit AES block. The decryption controller 112 generates the calculated initialization vector based on values provided by the Rx frame counter 116 and the Rx multiframe counter 118. The calculated initialization vector is then used in conjunction with the same AES key (previously used in encryption) to uniquely decrypt each 128-bit AES block. The counters 106, 108, 116, and 118 ultimately generate unique and calculated initialization vectors, which are each used only once for encryption and decryption respectively; therefore, the system 100 may provide more secure in-flight OTN encryption.

In yet another embodiment, the Tx frame counter 106, the Tx multiframe counter 108 and the block counter (not shown) are used to generate the unique initialization vector for AES encrypting and authenticating each 128-bit block of data. The unique initialization vector can be, for example, a concatenation of: {nonce, unused, multiframe count (MFI), frame count (MFAS), unused, block count}. As a result, the full counter does not increment continuously because it has unused bits in its range.

The block counter (not shown) may be a part of the encryption controller or a separate circuit. The block counter resets each frame (for a 64-bit authentication tag mode) or two frames (for a 128-bit authentication tag mode) and resides at the least significant bit location of the initialization vector. It has 11 useful bits that allows it to count 128-bit AES data blocks for up to 2 OTN frame payloads.

The combination of the Tx multiframe counter 106 and the Tx frame counter 108 is 38 bits. The 38 bits are derived from the concatenation of the 30 MFI bits and the 8 MFAS bits. 38 bits allows the combined multiframe-frame counters to uniquely count $2^{38}$ frames, which is equivalent to all of the OTN frames in $2^{30}$ multiframes. In other words, the 38 bit counter can count all of the frames in the diagram of FIG. 6. The nonce bits (32 bits) reside at the most significant bits location of the initialization vector. The nonce is a random value loaded into the encryption engine 104 at the start of each key session.

In a further embodiment, the MFI value is larger than 30 bits in length. Accordingly, the Tx and Rx multiframe counters are also larger than 30 bits in length. As discussed above, MFI values larger than 30 bits in length allow the system to count more than $2^{30}$ multiframes. Counting more multiframes allows the system to generate more unique initialization vectors and consequently extend the lifetime of the encryption key session.

The Rx frame counter 116, and Rx multiframe counter 118, and the block counter (not shown) are used in the same manner as above to generate the calculated initialization vector for AES decrypting each 128-bit block of encrypted OTN payload data.

The counters described above relate to the key lifetime or session length of the system 100. Since the block counter increments for each 128-bit AES block and the combined multiframe-frame counters increment for each frame over $2^{30}$ multiframes, these counters generate unique initialization vectors for each block of $2^{38}$ frames (e.g., all of the OTN payload data contained within FIG. 6); accordingly, the same encryption key may be used for encrypting and decrypting each of these blocks because the initialization vector can be changed for each block. As a consequence, the key lifetime or session length of the system 100 is $2^{30}$ multiframes (or, equivalently, $2^{38}$ OTN frames). As stated above, the time duration of the key session length is dependent on the transmission rate and, as an example, for ODU4, is approximately 80 hours for the system configured to count $2^{30}$ multiframes. Transmission rates faster than that of ODU4 have key sessions lengths of shorter time duration.

Alternatively, embodiments of the system configured to count more than $2^{30}$ multiframes may provide a key session length duration of more than 80 hours for ODU4.

Although the maximum key lifetime is specified by the counter bit depth (e.g., $2^{30}$ multiframes), the SPI 120 allows the system 100 to be configured according to any the key lifetime inclusively between 1 to $2^{30}$ multiframes. When the key expires according to the key lifetime configuration, the next key from the key table is used by both the transmitter and the receiver for encryption and decryption. The signal to switch to the next key in the key table is provided by the KTI value 52 as described above.

In a further embodiment, the frame counter value and the multiframe counter value are deterministically modified before concatenation into the initialization vector. For example, the counter values, which are sets of consecutive values, may be passed through a hash function or some other mapping in order to generate sets of non-consecutive values for concatenation into the initialization vector. The values are deterministically modified in the same manner at both the transmitter and the receiver; therefore, the resultant initialization vectors will be identical between the transmitter and the receiver and the encrypted OTN payload can be correctly decrypted.

In yet a further embodiment, the initialization vector additionally includes a unique transmitter identification. In order to correctly decrypt an OTN payload encrypted by a particular transmitter, the receiver must be configured to know the unique transmitter identification. Including the unique transmitter identification in the initialization vector further increases encryption security. Even if two different transmitters use the same key, each initialization vector would be different, resulting in different ciphertexts, which may reduce the risk of replay attack.

In further embodiments of the present disclosure, the system 100 provides for authentication to ensure that received OTN frames can be authenticated to a sender. Specifically, the transmitter uses the unique initialization vector, the encryption key and the OTN payload to generate a 64-bit authentication tag (e.g., a message authentication code, or MAC), which is then transmitted in-band in reserved byte area fields 38 and 40 of the OTN header as shown in FIG. 1. The receiver uses the calculated initialization vector, the decryption key, the encrypted payload, and the authentication tag to determine whether the encrypted OTN payload is authentic.

A 128-bit tag can be supported by authenticating two frames at a time and transmitting the tag in two parts. The number of frames depends on authentication tag length as described above.

In the present disclosure, the authentication tag region associated with the encrypted payload region may be carried in the same OTN frame. In other words, the authentication tag is carried in-band and there is no need for out-of-band authentication; this in-band solution improves the network efficiency of the OTN system.

When the system 100 functions includes authentication, the system 100 further comprises a Tx authentication engine, a Tx authentication controller, an Rx authentication engine, and an Rx authentication controller (not shown). The Tx authentication controller is coupled to the Tx authentication engine, the Tx frame counter 106 and the Tx multiframe counter 108. Similarly, the Rx authentication controller is coupled to the Rx authentication engine, the Rx frame counter 116 and the Rx multiframe counter 118.

The Tx authentication controller provides the unique initialization vector, the encryption key, and the OTN payload to the Tx authentication engine. The Tx authentication engine uses the data from the Tx authentication controller to generate the authentication tag of either 64 bits or 128 bits in length, depending on the configuration of the system 100.

The Rx authentication controller provides the calculated initialization vector, the decryption key, the encrypted payload, and the authentication tag to the Rx authentication engine. The Rx authentication engine will calculate a temporary tag based on the calculated initialization vector, the decryption key, and the encrypted payload; the Rx authentication engine can then compare the calculated tag with the received authentication tag in order to verify the authenticity of the encrypted payload. If the tags match, the system 100 can decrypt and accept the payload. If the tags do not match, the system 100 can reject the encrypted payload before decryption.

Accordingly, embodiments of the present disclosure support: AES encryption compatible with FIPS 197 specification and CAVP cryptographic reference vectors; AES-256 using CTR mode without GMAC authentication or with non-intrusive GMAC as defined in NIST 197 and SP 800-38A, with a latency of less than 500 ns for any ODUk rate; and AES-256 using GCM mode (CTR with GMAC authentication) as defined in SP NIST 800-38D, with the latency of 4 ODUk frames for 128-bit GMAC and 2 ODUk frames for 64-bit GMAC on top of the 500 ns encryption latency.

However, support of current encryption and authentication standards require adhering to the conditions surrounding the generation and use of initialization vectors as described above. Specifically, reuse of any encryption key and initialization vector combination can leave the system vulnerable to a replay attack. Furthermore, OTN systems may be susceptible to replay attacks because sequential OTN frames can take different routes from a transmitter to a receiver in an OTN network. For example, OTN networks commonly employ redundancy using working and protection links. When OTN traffic is switched from a working to a protection link, OTN frames may arrive at the receiver out-of-order, causing the counters 106, 116 and 108, 118 at the transmitter and the receiver to become unsynchronized. Unsynchronized counters create the possibility for accidentally reusing an initialization vector and encryption key combination, leaving the system susceptible to a replay attack. The underlying condition is referred to herein as frame slips and frame jumps.

According to embodiments of the present disclosure, the system 100 handles frame slips and frame jumps by sending, from the transmitter to the receiver, the in-band synchronization data comprising the MFI bits 44, 46, 48, and 50, transmitted in the PSI field 32 of OTN frames 253 to 256 of each multiframe.

Figure 8:
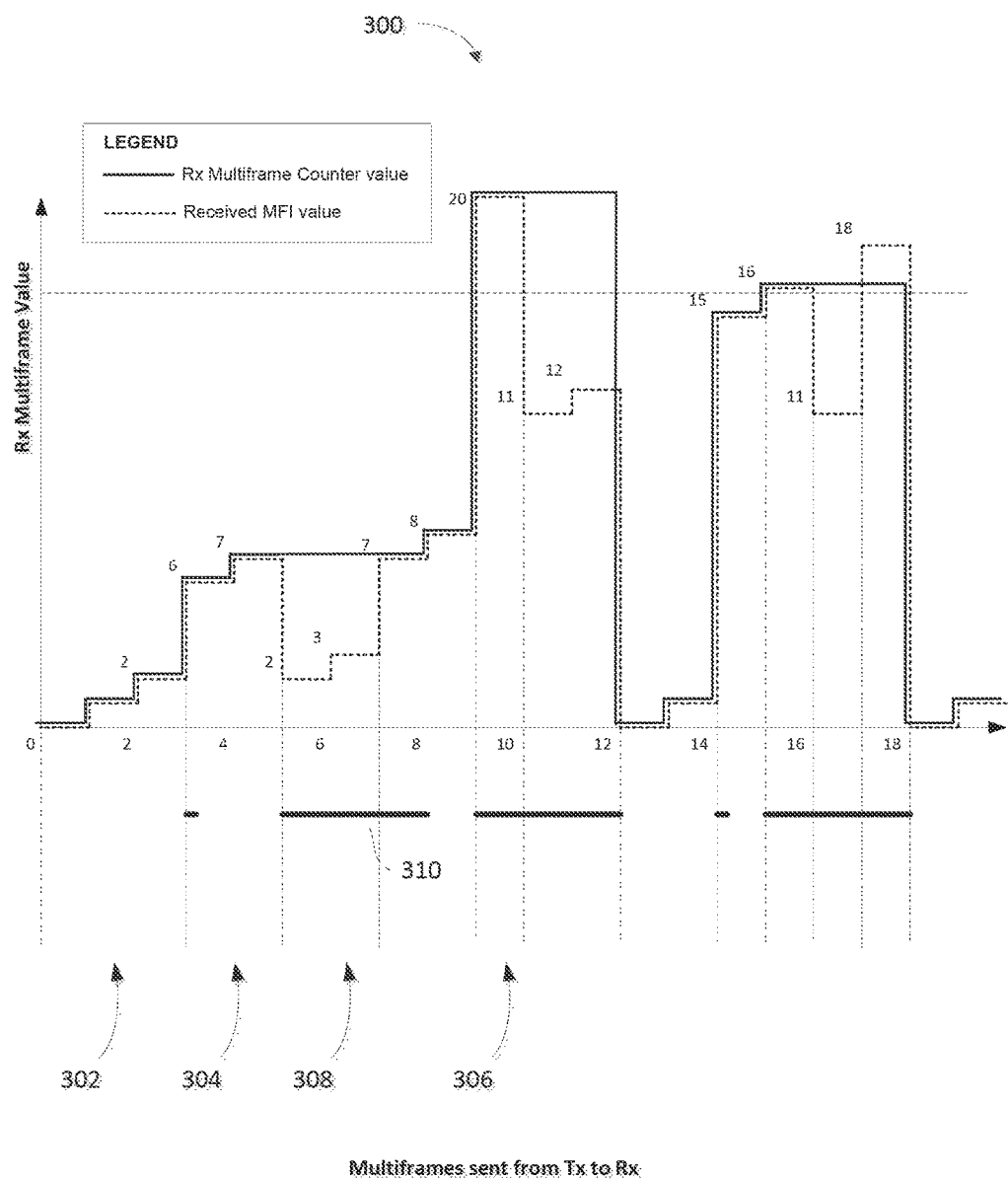
FIG. 8 is a graph showing another example operation of the system of FIG. 5.

FIG. 8 is a graph 300 showing an example operation of the system 100. Graph 300 shows a value of the Rx multiframe counter 118 compared to the MFI value transmitted in the PSI field 32 of OTN frames 253 to 256 of each multiframe sent from the transmitter to the receiver (both on the y-axis). The Rx decryption controller 112 compares the received MFI value to its internal multiframe count in order to synchronize the Rx multiframe counter 118 to the Tx multiframe counter 108.

Graph 300 shows that the Rx multiframe counter 118 is synchronized with the Tx multiframe counter 108 at period 302. The value of the Rx multiframe counter 118 matches the MFI value transmitted as in-band synchronization data.

Even though the transmitter steadily increments the MFI value, the receiver should be ready to receive unexpected MFI values, either due to network errors or spoofing (i.e., a replay attack). At period 304 for example, when the Rx decryption controller 112 receives a MFI value that is larger than the value of the Rx multiframe counter 118, the Rx decryption controller 112 updates the Rx multiframe counter 118 to the larger MFI value. This is acceptable behavior for a frame jump condition because the combination of the same key and a larger value of MFI has not been used yet, so it is safe to accept the encrypted OTN payload. This also effectively shortens the key lifetime.

At period 306 for example, when the received MFI value is larger than the configured maximum key lifetime multiframe count, the Rx decryption controller 112 treats the event similarly as in FIG. 7. At this point, the Rx decryption controller waits for a new decryption key and for the transmitter to synchronize its encryption key.

At period 308 for example, one of the conditions that contributes to the fail state and eventually results in overwriting the OTN payload area of a frame with a configurable failure pattern 310 is a negative jump in the combined {MFI, MFAS} value, which is treated as a counter replay attack. The negative jump, or frame slip condition, is not allowed in the system 100 when encryption is enabled.

In particular, when the Rx decryption controller 112 receives an in-band MFI value or receives an in-band MFAS value, and the combined {MFI, MFAS} value is smaller than the concatenated Rx multiframe counter 118 and Rx frame counter 116, the Rx decryption controller 112 treats the frame slip condition as a replay attack. The Rx decryption controller 112 inserts the failure pattern 310 into the OTN frame to overwrite the payload. The Rx decryption controller 112 waits until the combined {MFI, MFAS} value catches up to the next incremental value of the concatenated Rx multiframe counter 118 and Rx frame counter 116.

The procedure described above allows for synchronization between transmitter and receiver counters. During an OTN protection switching event, counters may become out-of-sync. The receiver has an opportunity to synchronize its counters on OTN multiframe boundaries. Specifically, if the receiver's counters are behind the synchronization data the transmitter is sending in-band, the receiver will catch up by updating its counters to the larger value of the in-band synchronization data. In the case the transmitter in-band synchronization data is behind, the receiver assumes the condition is caused by a replay attack and waits for the transmitter's counters to catch up. The receiver also overwrites the configurable payload region of the OTN frame for replay attack protection and for counting the number of failed frames. Overwriting the OTN payload with the failure pattern 310 allows the OTN system to maintain overall frame alignment in the event of a loss of counter synchronization. Moreover, overwriting the OTN payload makes sure that malicious data is terminated at the physical layer, avoiding data propagation to higher layers.

In embodiments according to the present disclosure, system 100 may further comprise a CRC calculator (not shown) that can use the CRC-8 polynomial $x^8+x^7+x^2+1$ (0xD5) to compute a CRC-8 value 42 on the 32 bits of data contained in MFI bits 44, 46, 48, 50, and KTI bits 52. The CRC may be realized using a shift register with the earliest bits fed into the register first. The transmitter inserts the calculated CRC value 42 into the PSI byte field 32 at the 252nd frame of each multiframe. The receiver computes a CRC on the received MFI and KTI values, compares the calculated CRC value with the received CRC value for determining the integrity of the MFI and KTI values.

In embodiments according to the present disclosure, system 100 may further comprise a BIP8 (bit-interleaved parity 8) compensation processor (not shown). In a conventional OTN transceiver, the BIP8 field is calculated over the entire OPUk region (columns 15 through 3824). In-flight encryption of OTN payload data causes changes to the OPUk; therefore, the system 100 may compensate the BIP8 fields in the PM and TCMi ODUk overhead bytes.

At the Tx path, the BIP8 compensation processor calculates the BIP8 on all OPUk bytes prior to encryption, calculates the BIP8 on all the bytes of the OPUk region after encryption, and then XORs the two BIP8 results (before and after encryption) with the BIP8 fields in the PM/TCMi overhead. In this way, any received in-band BIP8 errors (those indicated in the BIP8 fields in the PM/TCMi overhead) are preserved.

At the Rx path, the process is simply reversed at the decryption end by calculating the BIP8 over the OPUk prior to decryption and after decryption, and XOR'ing these 2 BIP8 values with the received in-band BIP8 in the PM/TCMi overhead. If there are no errors end to end the resulting BIP8 will be the BIP8 as it was prior to encryption. If there are errors anywhere in the system these will be preserved and detectable at the PM/TCMi sink.

In this way, in-flight encryption according to the present disclosure will not prevent existing network performance monitoring functions from working, and end-to-end PM-layer PMON capabilities will also be preserved and work transparently.

In embodiments according to the present disclosure, system 100 may further comprise a performance monitor (PMON) for counting the number of frames that failed decryption. Such failures may be the result of authentication issues, key out-of-sync, frame slips or frame jumps.

Figure 9:
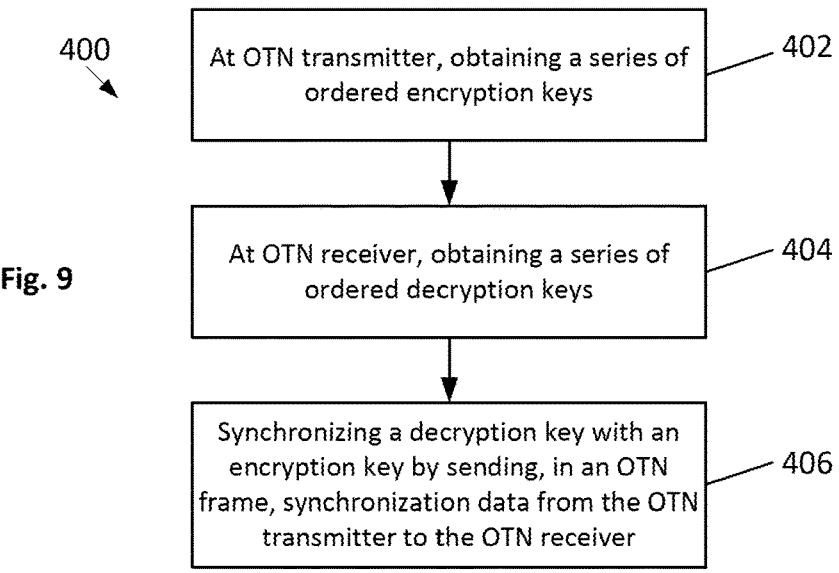
FIG. 9 is a flowchart of a method in accordance with an embodiment of the present disclosure.

FIG. 9 shows a flowchart of a method 400 in accordance with an embodiment of the present disclosure. At action 402, a series of ordered encryption keys is obtained at an OTN transmitter. The ordered encryption keys are be used one at a time and in sequential order for encrypting the OTN payload content to obtain OTN encrypted payload content. Obtaining the series of ordered encryption keys at the OTN transmitter can be effected in any suitable way such as, for example, receiving the encryption keys from the SPI 120 (shown at FIG. 5) or generating the encryption keys at the OTN transmitter. For security reasons, obtaining the encryption keys at the OTN transmitter can be exclusive of any encryption key of the series of ordered encryption keys being received at the OTN transmitter in an OTN frame.

At action 404, a series of ordered decryption keys is obtained at an OTN receiver. The ordered decryption keys are be used one at a time and in sequential order for decrypting the OTN payload content to obtain OTN decrypted payload content. Obtaining the series of ordered decryption keys at the OTN receiver can be effected in any suitable way such as, for example, receiving the decryption keys from the SPI 120 (shown at FIG. 5) or generating the encryption keys at the OTN receiver. Again, for security reasons, obtaining the decryption keys at the OTN receiver can be exclusive of any decryption key of the series of ordered decryption keys being received at the OTN receiver in an OTN frame.

At action 406, synchronization of a decryption key with an encryption key is effected by sending, in an OTN frame, synchronization data from the OTN transmitter to the OTN receiver. The key synchronization data is to indicate to the OTN receiver that the next key in the series of ordered decryption keys is to be used to decrypt forthcoming additional OTN encrypted payload content transmitted from the OTN transmitter. The forthcoming additional OTN encrypted payload content is the result of an encryption of additional OTN payload content with the next key in the series of ordered decryption keys.

Figure 10:
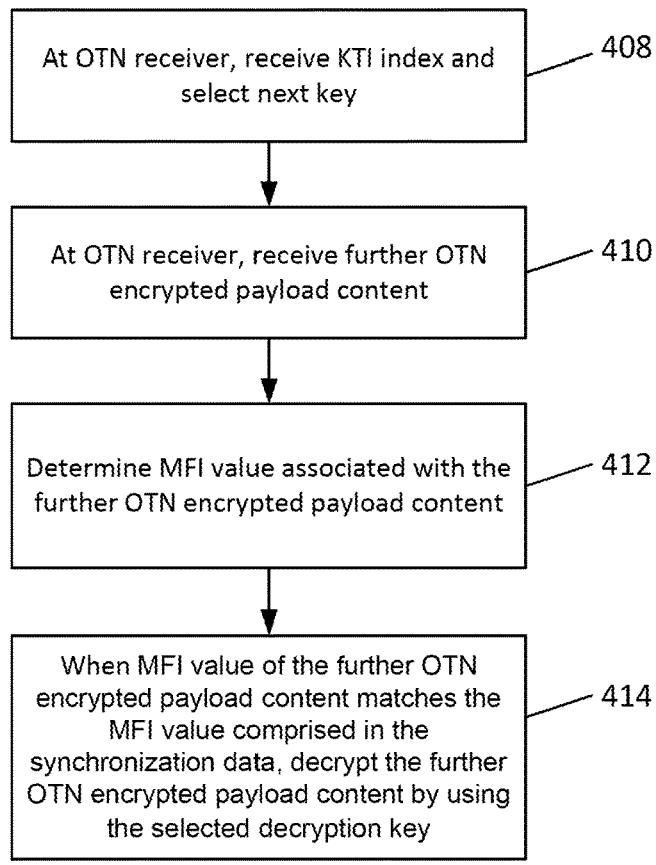
FIG. 10 is also flowchart of a method in accordance with an embodiment of the present disclosure.

The synchronization data sent from the OTN transmitter to the OTN receiver can comprise a Key Table Index (KTI) that identifies the next key in the series of ordered decryption keys to be used to decrypt the forthcoming additional OTN encrypted payload content. Further, the forthcoming additional OTN encrypted payload content can have associated thereto a Multi-Frame Indicator (MFI) value, which can be included in the synchronization data. In this scenario and as shown at FIG. 10, at the OTN receiver, subsequent being provided the synchronization data and in accordance with the KTI, the OTN receiver can select, at action 408, the next key in the series of ordered decryption keys to obtain a selected decryption key. The OTN receiver can receive, at action 410, further OTN encrypted payload content and, at action 412, determine a MFI value associated with the further OTN encrypted payload content. At action 414, when the MFI value of the further OTN encrypted payload content matches the MFI value comprised in the synchronization data, the OTN receiver can decrypt the further OTN encrypted payload content by using the selected decryption key.

Figure 11:
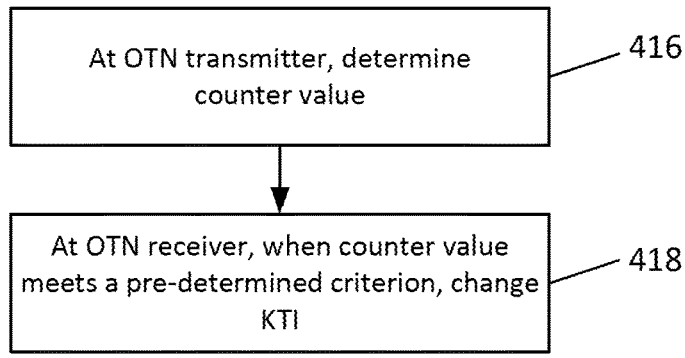
FIG. 11 is a further flowchart of a method in accordance with an embodiment of the present disclosure.

The OTN frame transmitted from the OTN transmitter to the OTN receiver can include a counter field having associated thereto a counter value. The counter field can be a concatenation of an MFI field, which includes a respective MFI value, and a Multi Frame Alignment Signal (MFAS) field, which includes a MFAS value associated with a number of MFAS transmitted by the OTN transmitter. In the scenario, with reference to FIG. 11, the method can further comprise, at the OTN transmitter, determining, at action 416, the counter value; and when the counter value meets (satisfies) a pre-determined criterion, changing, at action 418, the KTI. The pre-determined criterion can include the counter value being equal to a target counter value, the counter value being larger than the target counter value, or any other suitable criterion that causes changing the KTI.

Figure 12:
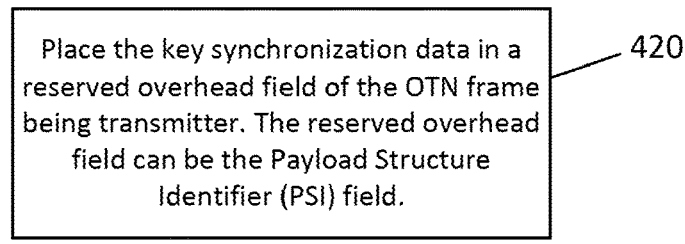
FIG. 12 is another flowchart of a method in accordance with an embodiment of the present disclosure.

With reference to FIG. 12, in some embodiments, synchronizing a decryption key of the series of ordered decryption keys with an encryption key of the series of ordered encryption keys includes placing the key synchronization data into a reserved overhead field of an OTN frame transmitted from the OTN transmitter to the OTN receiver.

In some embodiments, synchronizing a decryption key of the series of ordered decryption keys with an encryption key of the series of ordered encryption keys includes placing the key synchronization data into the Payload Structure Identifier (PSI) field of an OTN frame transmitted from the OTN transmitter to the OTN receiver.

Figure 13:
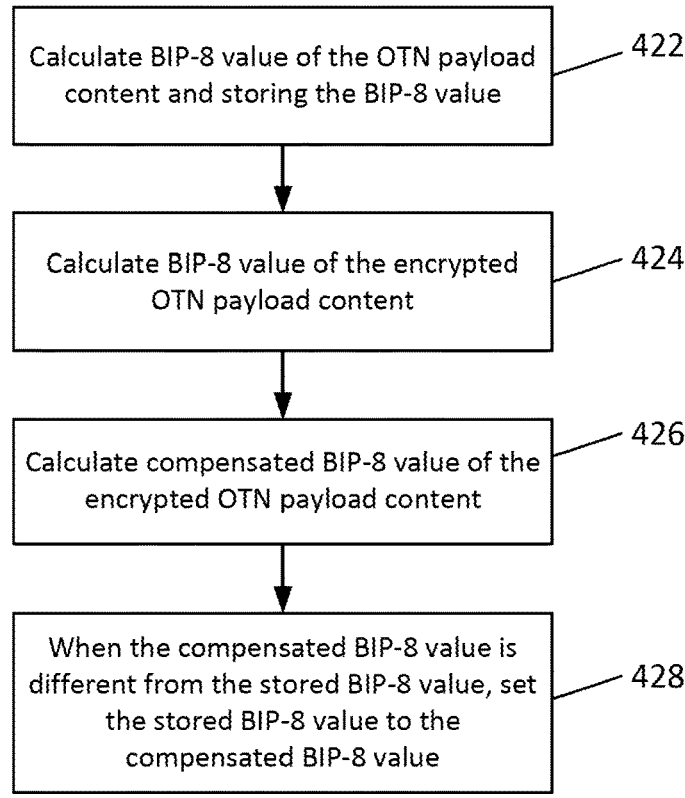
FIG. 13 is yet another flowchart of a method in accordance with an embodiment of the present disclosure.

In some embodiments, the OTN frame has a BIP-8 value and the method can further comprise, with reference to FIG. 13, compensating the stored BIP-8 value by: calculating, at action 422, prior to encryption, a BIP-8 value of the OTN payload content and storing that BIP-8 value. Calculating, at action 424, a BIP-8 value of the encrypted OTN payload content; and calculating, at action 426, a compensated BIP-8 value as function of: the BIP-8 value of the OTN payload content, the BIP-8 value of the encrypted OTN payload content, and the stored BIP-8 value. When the compensated BIP-8 value is different from the stored BIP-8 value, setting, at action 428, the stored BIP-8 value to the compensated BIP-8 value.

Figure 14:
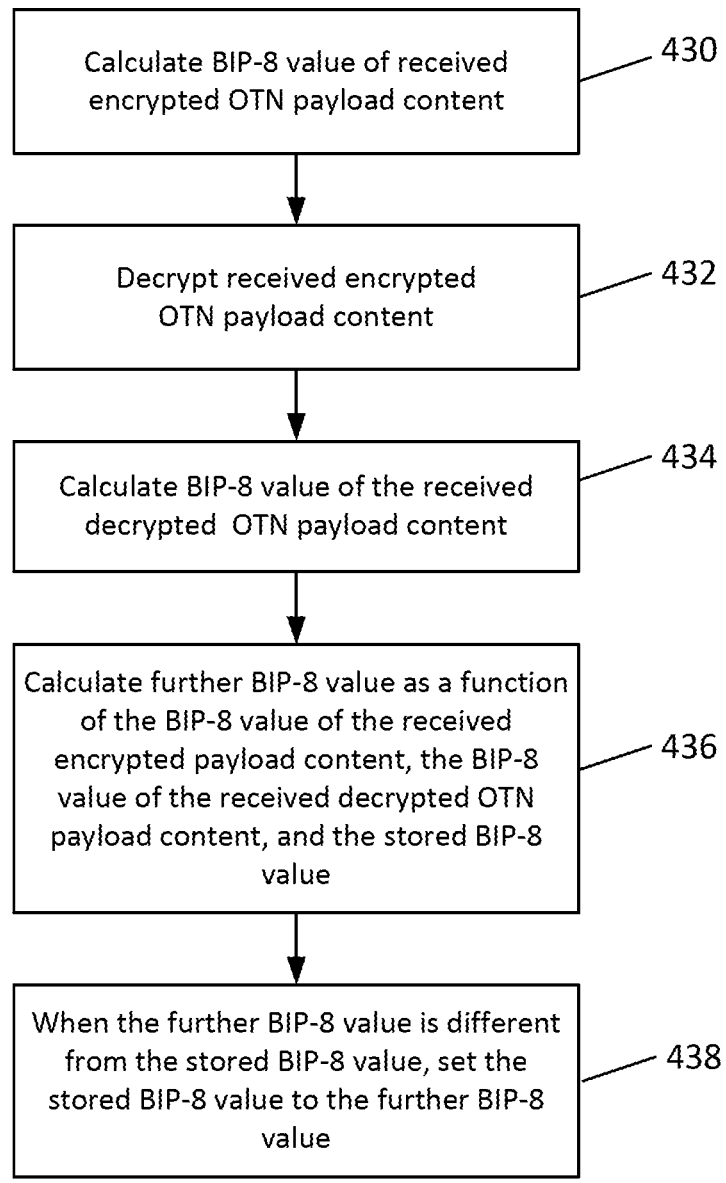
FIG. 14 is also a flowchart of a method in accordance with an embodiment of the present disclosure.

Subsequently, at the OTN receiver, as shown in FIG. 14, at action 430, a BIP-8 value of the received encrypted OTN payload content is calculated. At action 432, the received encrypted OTN payload content is decrypted to obtain received decrypted OTN payload content. At action 434, a BIP-8 value of the received decrypted OTN payload content is calculated. At action 436, a further BIP-8 value is calculated as a function of: the BIP-8 value of the received encrypted OTN payload content, the BIP-8 value of the received decrypted OTN payload content, and the stored BIP-8 value. And, at action 438, when the further BIP-8 value is different from the stored BIP-8 value, the stored BIP-8 value is set to the further BIP-8 value.

Figure 15:
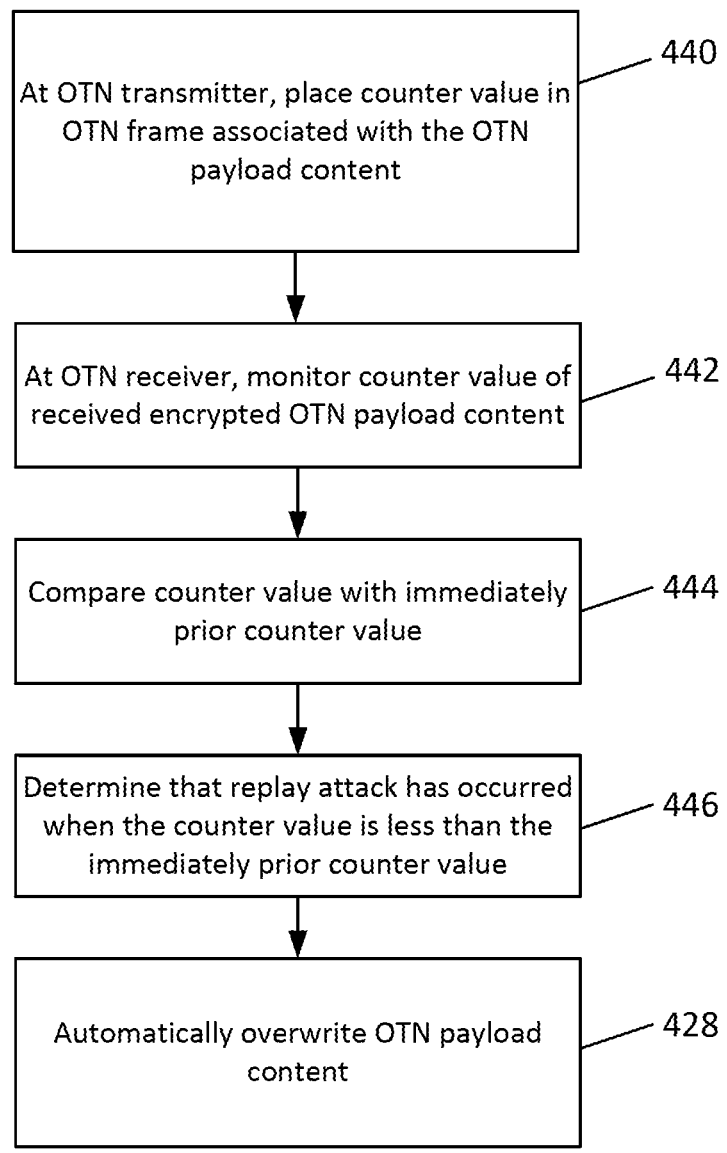
FIG. 15 is another flowchart of a method in accordance with an embodiment of the present disclosure.

In some embodiments and a shown at FIG. 15, at the OTN transmitter, a counter value is placed, at action 440, in an OTN frame associated with the OTN payload content. The counter value is a function of a multiframe indicator value and of a multiframe alignment signal value. At the OTN receiver, the counter value is monitored at action 442. The counter value is compared with an immediately prior counter value at action 444, and a determination of an occurrence of a replay attack is made, at action 446, when the counter value is less that the immediately prior counter value. When such a determination is made, the received encrypted OTN payload content can be automatically overwritten, at action 448.

Figure 16:
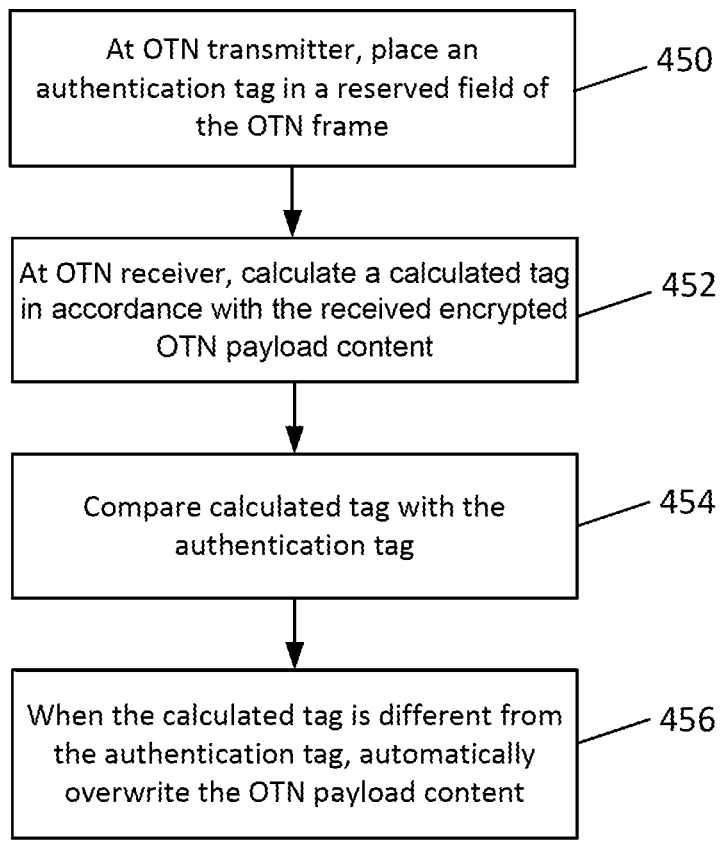
FIG. 16 is yet another flowchart of a method in accordance with an embodiment of the present disclosure.

In some embodiments, the method can further comprises, as shown at FIG. 16, at the OTN transmitter, placing 450 an authentication tag in a reserved field of and OTN frame associated with the OTN payload content, the authentication tag being a function of the OTN payload content. At action 452, at the OTN receiver, calculating a calculated tag in accordance with the received encrypted OTN payload content and comparing 454 the calculated tag with the authentication tag. When the calculated tag is different from the authentication tag, automatically overwriting, at action 456, the payload content of the OTN frame.

Figure 17:
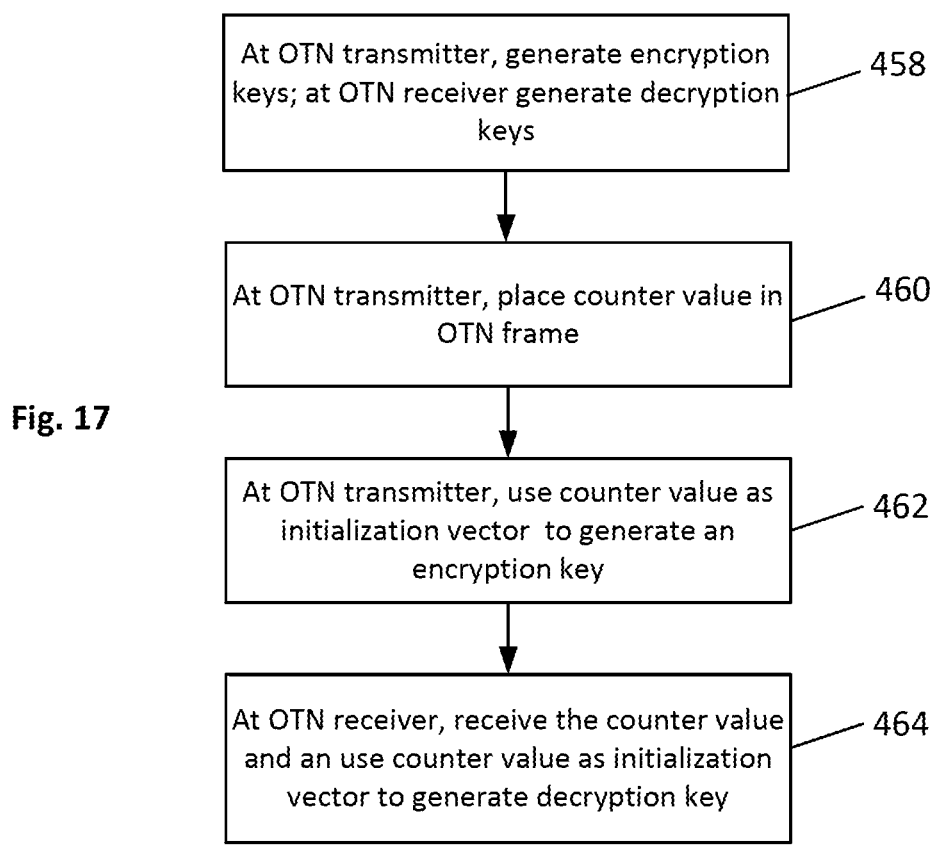
FIG. 17 is also a flowchart of a method in accordance with an embodiment of the present disclosure.

In some embodiments, the series of ordered encryption keys are generated at the OTN transmitter and, the series of the ordered decryption keys is generated at the OTN receiver. This is shown at action 458 of FIG. 17. At the OTN transmitter, a counter value can be placed, at action 460, in an OTN frame associated with the OTN payload content. The counter value can be a function of a multiframe indicator value and of a multiframe alignment signal value. At action 462, the counter value is used as an initialization vector to generate one of the encryption keys. At action 464, at the OTN receiver, the counter value is received and the counter value is used as the initialization vector to generate one of the decryption keys.

Figure 18:
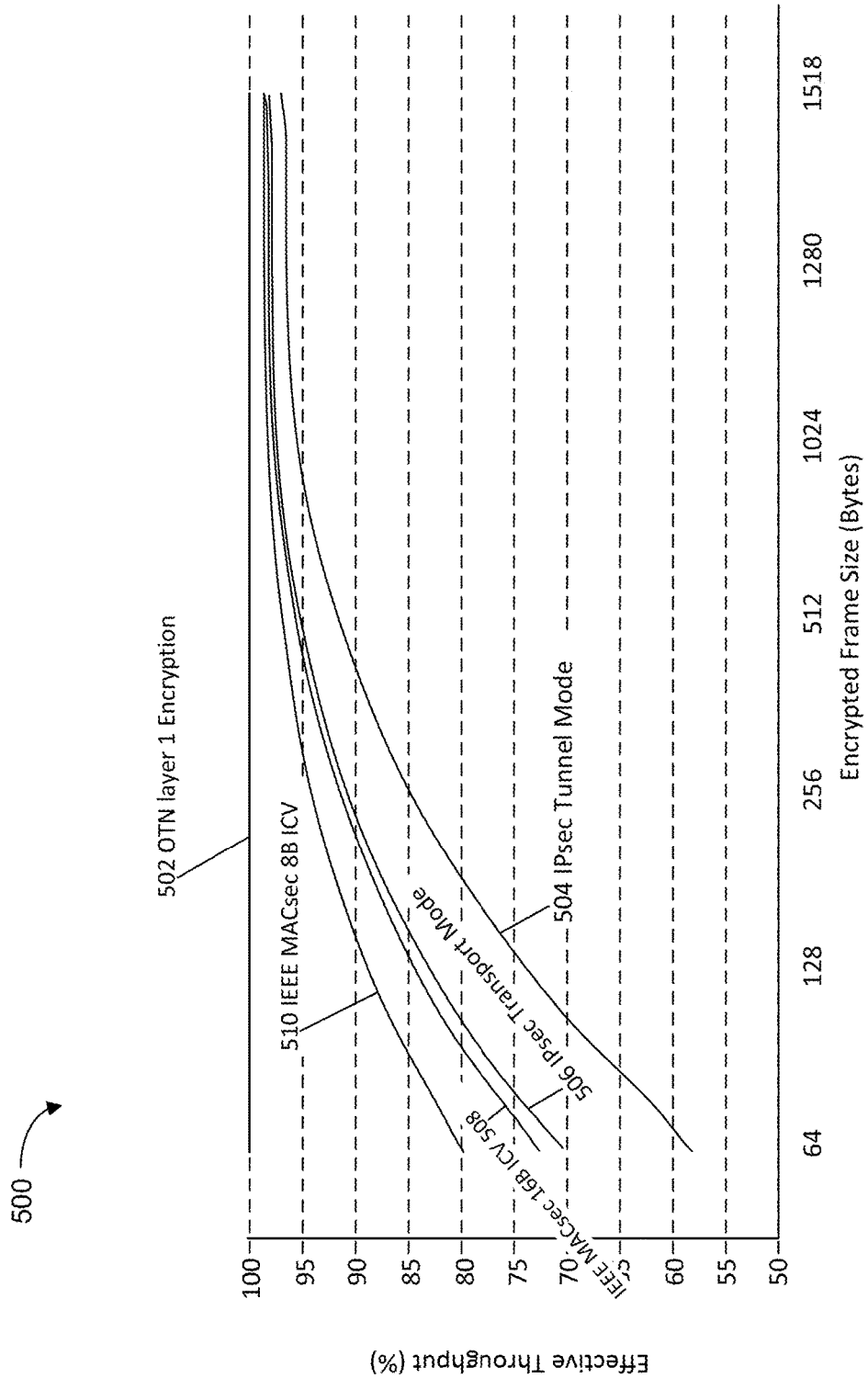
FIG. 18 is a graph showing the approximate effective throughput of various encryption methods for an OTN communications system.

FIG. 18 is a graph 400 showing the approximate effective throughput (as a percentage of maximum) of various encryption methods for an OTN communications system. In the example test results of FIG. 18, the graph 500 shows that no matter the chosen encryption frame size, the system 100 of the present disclosure is 100% throughput efficient, as shown at plot 502, because the system 100 does not add additional encryption overhead bits. In contrast, conventional higher-layer encryption solutions may necessitate encryption overhead bits, leading to lower network efficiency particularly at smaller encryption frame sizes. For example, higher-layer in-flight encryption solutions such as IPsec (plot 504 relates to IPsec Tunnel Mode and plot 506 relates to IPsec Transport Mode) shows effective throughput as low as 58-70%, while MACsec (plot 508 relates to IEEE MACsec ICV and plot 410 relates to IEEE MACsec 8B ICV) shows effective throughput as low as 73-80%.

Accordingly, embodiments of the present disclosure provide a method and system of high effective throughput OTN in-flight encryption having robust security features such as: periodic key switching, periodic initialization vector switching (for use with a counter-mode block cipher, for example), and per-frame authentication.

As described above, embodiments of the present disclosure provide a layer 1 in-flight encryption solution. In particular, the layer 1 solution provides encryption to an OTN communication system. Layer 1 of the OSI model—the physical layer—which describes the physical hardware specification of telecommunications equipment. Therefore, the layer 1 solution of the present disclosure relates to physical layer OTN communications hardware.

In addition to providing in-flight encryption, the layer 1 solution of the present disclosure can also provide a message authentication code for each block of in-flight encrypted data.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

In the context of the present disclosure, elements can be said to be operationally connected to each other when, for example, a signal present in one element can be communicated to another element. Further, elements can be said to be operationally connected when an action in, or state of, one element can be controlled by, or related to, an action in, or a state of, another element.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for encrypting and decrypting Optical Transport Network (OTN) payload content, the method, comprising:
    obtaining, at an OTN transmitter, a series of ordered encryption keys to be used one at a time and in sequential order for encrypting the OTN payload content to obtain OTN encrypted payload content;
    obtaining, at an OTN receiver, a series of ordered decryption keys to be used one at a time and in sequential order for decrypting the encrypted OTN payload content; and
    synchronizing a decryption key of the series of ordered decryption keys with an encryption key of the series of ordered encryption keys by providing, in an OTN frame transmitted from the OTN transmitter to the OTN receiver, key synchronization data, the key synchronization data to indicate to the OTN receiver that a next key in the series of ordered decryption keys is to be used to decrypt forthcoming additional OTN encrypted payload content transmitted from the OTN transmitter, the forthcoming additional OTN encrypted payload content being the result of an encryption of additional OTN payload content with the next key in the series of ordered decryption keys, the key synchronization data comprising a Key Table Index (KTI) that identifies the next key in the series of ordered decryption keys to be used to decrypt the forthcoming additional OTN encrypted payload content, and the forthcoming additional OTN encrypted payload content having associated thereto a Multi-Frame Indicator (MFI) value, the key synchronization data further comprising the MFI value;
    at the OTN receiver, subsequent being provided the synchronization data:
        in accordance with the KTI, selecting the next key in the series of ordered decryption keys to obtain a selected decryption key;
        receiving further OTN encrypted payload content;
        determining a MFI value associated to the further OTN encrypted payload content; and
        when the MFI value of the further OTN encrypted payload content matches the MFI value comprised in the synchronization data, decrypting the further OTN encrypted payload content by using the selected decryption key;
    wherein each OTN frame transmitted from the OTN transmitter to the OTN receiver includes a counter field having associated thereto a counter value, the counter field being a concatenation of an MFI field, which includes a respective MFI value, and a Multi Frame Alignment Signal (MFAS) field, which includes a MFAS value associated with a number of MFAS transmitted by the OTN transmitter, the method further comprising:
        at the OTN transmitter, determining the counter value; and
        when the counter value meets a pre-determined criterion, changing the KTI.

2. The method of claim 1 wherein the pre-determined criterion is one of the counter value being equal to a target counter value and the counter value being larger than the target counter value.

3. The method of claim 1 wherein synchronizing a decryption key of the series of ordered decryption keys with an encryption key of the series of ordered encryption keys includes placing the key synchronization data into a reserved overhead field of an OTN frame transmitted from the OTN transmitter to the OTN receiver.

4. The method of claim 1 wherein synchronizing a decryption key of the series of ordered decryption keys with an encryption key of the series of ordered encryption keys includes placing the key synchronization data into the Payload Structure Identifier (PSI) field of an OTN frame transmitted from the OTN transmitter to the OTN receiver.

5. The method of claim 1 wherein, an OTN frame has a BIP-8 value stored therein, the method further comprising, at the OTN transmitter, compensating the stored BIP-8 value by:
    calculating a BIP-8 value of the OTN payload content;
    calculating a BIP-8 value of the encrypted OTN payload content; and calculating a compensated BIP-8 value as function of:
the BIP-8 value of the OTN payload content,
the BIP-8 value of the encrypted OTN payload content, and
the stored BIP-8 value;
and,
when the compensated BIP-8 value is different from the stored BIP-8 value, setting the stored BIP-8 value to the compensated BIP-8 value.

6. A method for encrypting and decrypting Optical Transport Network (OTN) payload content, the method, comprising:
obtaining, at an OTN transmitter, a series of ordered encryption keys to be used one at a time and in sequential order for encrypting the OTN payload content to obtain OTN encrypted payload content;
obtaining, at an OTN receiver, a series of ordered decryption keys to be used one at a time and in sequential order for decrypting the encrypted OTN payload content; and
synchronizing a decryption key of the series of ordered decryption keys with an encryption key of the series of ordered encryption keys by providing, in an OTN frame transmitted from the OTN transmitter to the OTN receiver, key synchronization data, the key synchronization data to indicate to the OTN receiver that a next key in the series of ordered decryption keys is to be used to decrypt forthcoming additional OTN encrypted payload content transmitted from the OTN transmitter, the forthcoming additional OTN encrypted payload content being the result of an encryption of additional OTN payload content with the next key in the series of ordered decryption keys wherein, an OTN frame has a BIP-8 value stored therein, the method further comprising,
at the OTN transmitter, compensating the stored BIP-8 value by:
calculating a BIP-8 value of the OTN payload content;
calculating a BIP-8 value of the encrypted OTN payload content; and
calculating a compensated BIP-8 value as function of:
the BIP-8 value of the OTN payload content,
the BIP-8 value of the encrypted OTN payload content, and
the stored BIP-8 value;
and,
when the compensated BIP-8 value is different from the stored BIP-8 value, setting the stored BIP-8 value to the compensated BIP-8 value wherein, calculating the compensated BIP-8 value includes performing an exclusive 'or' operation between the BIP-8 value of the OTN payload content, the BIP-8 value of the encrypted OTN payload content, and the stored BIP-8 value.

7. The method of claim 5 further comprising, at the OTN receiver:
calculating a BIP-8 value of the received encrypted OTN payload content;
decrypting the received encrypted OTN payload content to obtain received decrypted OTN payload content;
calculating a BIP-8 value of the received decrypted OTN payload content;
calculating a further BIP-8 value as a function of:
the BIP-8 value of the received encrypted OTN payload content,
the BIP-8 value of the received decrypted OTN payload content, and
the stored BIP-8 value;
and
when the further BIP-8 value is different from the stored BIP-8 value, setting the stored BIP-8 value to the further BIP-8 value.

8. A method for encrypting and decrypting Optical Transport Network (OTN) payload content, the method, comprising:
obtaining, at an OTN transmitter, a series of ordered encryption keys to be used one at a time and in sequential order for encrypting the OTN payload content to obtain OTN encrypted payload content;
obtaining, at an OTN receiver, a series of ordered decryption keys to be used one at a time and in sequential order for decrypting the encrypted OTN payload content; and
synchronizing a decryption key of the series of ordered decryption keys with an encryption key of the series of ordered encryption keys by providing, in an OTN frame transmitted from the OTN transmitter to the OTN receiver, key synchronization data, the key synchronization data to indicate to the OTN receiver that a next key in the series of ordered decryption keys is to be used to decrypt forthcoming additional OTN encrypted payload content transmitted from the OTN transmitter, the forthcoming additional OTN encrypted payload content being the result of an encryption of additional OTN payload content with the next key in the series of ordered decryption keys wherein, an OTN frame has a BIP-8 value stored therein, the method further comprising, at the OTN transmitter, compensating the stored BIP-8 value by:
calculating a BIP-8 value of the OTN payload content;
calculating a BIP-8 value of the encrypted OTN payload content; and
calculating a compensated BIP-8 value as function of:
the BIP-8 value of the OTN payload content,
the BIP-8 value of the encrypted OTN payload content, and
the stored BIP-8 value;
and,
when the compensated BIP-8 value is different from the stored BIP-8 value, setting the stored BIP-8 value to the compensated BIP-8 value;
the method further comprising:
calculating a BIP-8 value of the received encrypted OTN payload content;
decrypting the received encrypted OTN payload content to obtain received decrypted OTN payload content;
calculating a BIP-8 value of the received decrypted OTN payload content;
calculating a further BIP-8 value as a function of:
the BIP-8 value of the received encrypted OTN payload content,
the BIP-8 value of the received decrypted OTN payload content, and
the stored BIP-8 value;
and
when the further BIP-8 value is different from the stored BIP-8 value, setting the stored BIP-8 value to the further BIP-8 value wherein, calculating the further BIP-8 value includes performing an exclusive 'or' operation between the BIP-8 value of the received encrypted OTN payload content, the BIP-8 value of the received decrypted OTN payload content, and the stored BIP-8 value.

9. The method of claim 1 further comprising, at the OTN transmitter:
placing a counter value in an OTN frame associated with the OTN payload content, the counter value being a function of a multiframe indicator value and of a multiframe alignment signal value.

10. The method of claim 9 further comprising, at the OTN receiver:
monitoring the counter value;
comparing the counter value with an immediately prior counter value; and
determining an occurrence of a replay attack when the counter value is less that the immediately prior counter value.

11. The method of claim 10 further comprising, when a replay attack is determined to have occurred, automatically overwriting the payload content of the OTN frame.

12. A method for encrypting and decrypting Optical Transport Network (OTN) payload content, the method comprising:
obtaining, at an OTN transmitter, a series of ordered encryption keys to be used one at a time and in sequential order for encrypting the OTN payload content to obtain OTN encrypted payload content;
obtaining, at an OTN receiver, a series of ordered decryption keys to be used one at a time and in sequential order for decrypting the encrypted OTN payload content;
synchronizing a decryption key of the series of ordered decryption keys with an encryption key of the series of ordered encryption keys by providing, in an OTN frame transmitted from the OTN transmitter to the OTN receiver, key synchronization data, the key synchronization data to indicate to the OTN receiver that a next key in the series of ordered decryption keys is to be used to decrypt forthcoming additional OTN encrypted payload content transmitted from the OTN transmitter, the forthcoming additional OTN encrypted payload content being the result of an encryption of additional OTN payload content with the next key in the series of ordered decryption keys; and
at the OTN transmitter, placing an authentication tag in a reserved field of and OTN frame associated with the OTN payload content, the authentication tag being a function of the OTN payload content.

13. The method of claim 12 further comprising, at the OTN receiver:
calculating a calculated tag in accordance with the received encrypted OTN payload content;
comparing the calculated tag with the authentication tag; and
when the calculated tag is different from the authentication tag, automatically overwriting the payload content of the OTN frame.

14. The method of claim 12 further comprising:
at the OTN transmitter, generating the series of ordered encryption keys; and,
at the OTN receiver, generating the series of ordered decryption keys.

15. The method of claim 14 further comprising:
at the OTN transmitter:
placing a counter value in an OTN frame associated with OTN payload content, the counter value being a function of a multiframe indicator value and of a multiframe alignment signal value; and
using the counter value as an initialization vector to generate one of the encryption keys of the series of ordered encryption keys;
and,
at the OTN receiver:
receiving the counter value; and
using the counter value as the initialization vector to generate one of the decryption keys of the series of ordered decryption keys.

* * * * *